United States Patent
Chiang et al.

(10) Patent No.: US 8,378,552 B2
(45) Date of Patent: Feb. 19, 2013

(54) ELECTROCHEMICAL ACTUATOR

(75) Inventors: Yet-Ming Chiang, Framingham, MA (US); Michael J. Cima, Winchester, MA (US); Timothy E. Chin, San Jose, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/316,833

(22) Filed: Dec. 12, 2011

(65) Prior Publication Data

US 2012/0146453 A1 Jun. 14, 2012

Related U.S. Application Data

(63) Continuation of application No. 12/960,224, filed on Dec. 3, 2010, now Pat. No. 8,093,781, which is a continuation of application No. 11/881,830, filed on Jul. 26, 2007, now Pat. No. 7,872,396, which is a continuation-in-part of application No. 11/150,477, (Continued)

(51) Int. Cl.
    *H01L 41/08* (2006.01)
(52) U.S. Cl. .................................. 310/311; 294/242
(58) Field of Classification Search .............. 310/311, 310/328, 332, 364
    See application file for complete search history.

(56) References Cited

U.S. PATENT DOCUMENTS

| | | |
|---|---|---|
| 3,573,511 A | 4/1971 | Noren |
| 4,060,741 A | 11/1977 | Schafft |
| 4,093,885 A | 6/1978 | Brown |
| 4,194,062 A | 3/1980 | Carides et al. |
| 4,382,882 A | 5/1983 | Vogel et al. |
| 4,648,271 A | 3/1987 | Woolf |
| 5,016,047 A | 5/1991 | Meacham |
| 5,255,809 A | 10/1993 | Ervin et al. |
| 5,268,082 A | 12/1993 | Oguro et al. |
| 5,351,164 A | 9/1994 | Grigortchak et al. |
| 5,432,395 A | 7/1995 | Grahn |
| 5,478,668 A | 12/1995 | Gozdz et al. |
| 5,567,284 A | 10/1996 | Bauer et al. |
| 5,671,905 A | 9/1997 | Hopkins, Jr. |

(Continued)

FOREIGN PATENT DOCUMENTS

| | | |
|---|---|---|
| DE | 19809483 A1 | 9/1999 |
| DE | 10026264 A1 | 11/2001 |

(Continued)

OTHER PUBLICATIONS

[No Author Listed] Biovalue Products, Technologies: e-Patch. Jun. 26, 2006. Available at http://www.valeritas.com/epatch.shtml.

(Continued)

*Primary Examiner* — Mark Budd
(74) *Attorney, Agent, or Firm* — Wolf, Greenfield & Sacks, P.C.

(57) ABSTRACT

The present invention provides systems, devices, and related methods, involving electrochemical actuation. In some cases, application of a voltage or current to a system or device of the invention may generate a volumetric or dimensional change, which may produce mechanical work. For example, at least a portion of the system may be constructed and arranged to be displaced from a first orientation to a second orientation. Systems such as these may be useful in various applications, including pumps (e.g., infusion pumps) and drug delivery devices, for example.

22 Claims, 18 Drawing Sheets

Related U.S. Application Data filed on Jun. 13, 2005, now Pat. No. 7,541,715, which is a continuation-in-part of application No. 11/796,138, filed on Apr. 26, 2007, now Pat. No. 7,994,686.

(60) Provisional application No. 60/578,855, filed on Jun. 14, 2004, provisional application No. 60/621,051, filed on Oct. 25, 2004, provisional application No. 60/833,412, filed on Jul. 26, 2006, provisional application No. 60/795,328, filed on Apr. 26, 2006.

(56) References Cited

U.S. PATENT DOCUMENTS

| | | |
|---|---|---|
| 5,747,915 A | 5/1998 | Benavides |
| 5,770,913 A | 6/1998 | Mizzi |
| 5,800,420 A | 9/1998 | Gross et al. |
| 5,848,911 A | 12/1998 | Garcin |
| 5,858,001 A | 1/1999 | Tsals et al. |
| 5,866,971 A | 2/1999 | Lazarus et al. |
| 5,907,211 A | 5/1999 | Hall et al. |
| 5,954,079 A | 9/1999 | Barth et al. |
| 5,957,895 A | 9/1999 | Sage et al. |
| 5,986,864 A | 11/1999 | Davis |
| 5,989,423 A | 11/1999 | Kamen et al. |
| 6,098,661 A | 8/2000 | Yim et al. |
| 6,109,852 A | 8/2000 | Shahinpoor et al. |
| 6,400,489 B1 | 6/2002 | Suzuki et al. |
| 6,517,972 B1 | 2/2003 | Amatucci |
| 6,530,900 B1 | 3/2003 | Daily et al. |
| 6,545,384 B1 | 4/2003 | Pelrine et al. |
| 6,555,945 B1 | 4/2003 | Baughman et al. |
| 6,577,039 B2 | 6/2003 | Ishida et al. |
| 6,586,810 B2 | 7/2003 | Thakur |
| 6,589,229 B1 | 7/2003 | Connelly et al. |
| 6,599,662 B1 | 7/2003 | Chiang et al. |
| 6,682,500 B2 | 1/2004 | Soltanpour et al. |
| 6,687,536 B1 | 2/2004 | Beck et al. |
| 6,689,100 B2 | 2/2004 | Connelly et al. |
| 6,699,218 B2 | 3/2004 | Flaherty et al. |
| 6,752,787 B1 | 6/2004 | Causey, III et al. |
| 6,828,062 B2 | 12/2004 | Lu et al. |
| 6,938,945 B2 | 9/2005 | Wald et al. |
| 6,960,192 B1 | 11/2005 | Flaherty et al. |
| 6,982,514 B1 | 1/2006 | Lu et al. |
| 7,005,078 B2 | 2/2006 | Van Lintel et al. |
| 7,014,625 B2 | 3/2006 | Bengtsson |
| 7,025,743 B2 | 4/2006 | Mann et al. |
| 7,044,928 B2 | 5/2006 | LeMay et al. |
| 7,115,108 B2 | 10/2006 | Wilkinson et al. |
| 7,144,384 B2 | 12/2006 | Gorman et al. |
| 7,156,838 B2 | 1/2007 | Gabel et al. |
| 7,205,669 B2 | 4/2007 | Miyazaki |
| 7,273,889 B2 | 9/2007 | Mermelstein et al. |
| 7,274,128 B1 | 9/2007 | Liu et al. |
| 7,298,017 B1 | 11/2007 | Liu et al. |
| 7,364,568 B2 | 4/2008 | Angel et al. |
| 7,410,476 B2 | 8/2008 | Wilkinson et al. |
| 7,435,362 B2 | 10/2008 | Muraoka et al. |
| 7,444,812 B2 | 11/2008 | Kirkpatirck et al. |
| 7,449,090 B2 | 11/2008 | Andrews et al. |
| 7,541,715 B2 | 6/2009 | Chiang et al. |
| 7,569,050 B2 | 8/2009 | Moberg et al. |
| D602,155 S | 10/2009 | Foley et al. |
| D602,586 S | 10/2009 | Foley et al. |
| 7,632,247 B2 | 12/2009 | Adams |
| 7,652,907 B2 | 1/2010 | Bloch et al. |
| 7,733,000 B2 | 6/2010 | Kudoh |
| 7,828,771 B2 | 11/2010 | Chiang et al. |
| 7,829,213 B2 | 11/2010 | Jacobson et al. |
| 7,872,396 B2 * | 1/2011 | Chiang et al. ............... 310/311 |
| 7,923,895 B2 | 4/2011 | Chiang et al. |
| 7,994,686 B2 | 8/2011 | Chiang et al. |
| 7,999,435 B2 * | 8/2011 | Chiang et al. ............... 310/311 |
| 8,093,781 B2 | 1/2012 | Chiang et al. |
| 8,247,946 B2 | 8/2012 | Chiang et al. |
| 2001/0053887 A1 | 12/2001 | Douglas et al. |
| 2002/0039620 A1 | 4/2002 | Shahinpoor et al. |
| 2003/0135159 A1 | 7/2003 | Daily et al. |
| 2003/0167035 A1 | 9/2003 | Flaherty et al. |
| 2003/0170166 A1 | 9/2003 | Smalley et al. |
| 2004/0038251 A1 | 2/2004 | Smalley et al. |
| 2005/0112427 A1 | 5/2005 | Bailey et al. |
| 2005/0119618 A1 | 6/2005 | Gonnelli |
| 2005/0227071 A1 | 10/2005 | Muraoka et al. |
| 2006/0095014 A1 | 5/2006 | Ethelfeld |
| 2006/0102455 A1 | 5/2006 | Chiang et al. |
| 2006/0169954 A1 | 8/2006 | Smela et al. |
| 2006/0206099 A1 | 9/2006 | Olsen |
| 2006/0231399 A1 | 10/2006 | Smalley et al. |
| 2007/0021733 A1 | 1/2007 | Hansen et al. |
| 2007/0049865 A1 | 3/2007 | Radmer et al. |
| 2007/0112301 A1 | 5/2007 | Preuthun et al. |
| 2007/0254216 A1 | 11/2007 | Hara et al. |
| 2007/0282269 A1 | 12/2007 | Carter et al. |
| 2007/0287753 A1 | 12/2007 | Charney et al. |
| 2007/0299397 A1 | 12/2007 | Alferness et al. |
| 2007/0299398 A1 | 12/2007 | Alferness et al. |
| 2007/0299399 A1 | 12/2007 | Alferness et al. |
| 2007/0299400 A1 | 12/2007 | Alferness et al. |
| 2007/0299401 A1 | 12/2007 | Alferness et al. |
| 2007/0299408 A1 | 12/2007 | Alferness et al. |
| 2008/0009805 A1 | 1/2008 | Ethelfeld |
| 2008/0015494 A1 | 1/2008 | Santini et al. |
| 2008/0043515 A1 | 2/2008 | Bloch |
| 2008/0051710 A1 | 2/2008 | Moberg et al. |
| 2008/0058718 A1 | 3/2008 | Adams et al. |
| 2008/0157713 A1 | 7/2008 | Chiang et al. |
| 2008/0160373 A1 | 7/2008 | Schumm |
| 2008/0167620 A1 | 7/2008 | Adams et al. |
| 2008/0215006 A1 | 9/2008 | Thorkild |
| 2008/0255516 A1 | 10/2008 | Yodfat et al. |
| 2008/0257718 A1 * | 10/2008 | Chiang et al. ............... 204/242 |
| 2008/0269687 A1 | 10/2008 | Chong et al. |
| 2008/0281270 A1 | 11/2008 | Cross et al. |
| 2008/0317615 A1 | 12/2008 | Banister |
| 2008/0319414 A1 | 12/2008 | Yodfat et al. |
| 2009/0014320 A1 * | 1/2009 | Chiang et al. ............... 204/252 |
| 2009/0028824 A1 | 1/2009 | Chiang et al. |
| 2009/0036867 A1 | 2/2009 | Glejboel et al. |
| 2009/0054866 A1 | 2/2009 | Teisen-Simony et al. |
| 2009/0062747 A1 | 3/2009 | Saul |
| 2009/0088693 A1 | 4/2009 | Carter |
| 2009/0088694 A1 | 4/2009 | Carter et al. |
| 2009/0088722 A1 | 4/2009 | Wojcik |
| 2009/0099521 A1 | 4/2009 | Gravesen et al. |
| 2009/0099522 A1 | 4/2009 | Kamen et al. |
| 2009/0124997 A1 | 5/2009 | Pettis et al. |
| 2009/0163855 A1 | 6/2009 | Shin et al. |
| 2009/0163874 A1 | 6/2009 | Krag et al. |
| 2009/0171324 A1 | 7/2009 | Chong et al. |
| 2009/0182277 A1 | 7/2009 | Carter |
| 2009/0192471 A1 | 7/2009 | Carter et al. |
| 2009/0198215 A1 | 8/2009 | Chong et al. |
| 2009/0326454 A1 | 12/2009 | Cross et al. |
| 2009/0326455 A1 | 12/2009 | Carter |
| 2009/0326472 A1 | 12/2009 | Carter et al. |
| 2010/0007248 A1 | 1/2010 | Chiang et al. |
| 2010/0022992 A1 | 1/2010 | Genosar et al. |
| 2010/0063438 A1 | 3/2010 | Bengtsson |
| 2010/0129699 A1 | 5/2010 | Mikhaylik et al. |
| 2010/0304215 A1 | 12/2010 | Suh et al. |
| 2011/0098643 A1 | 4/2011 | Chiang et al. |
| 2012/0025671 A1 | 2/2012 | Chiang et al. |
| 2012/0175998 A1 | 7/2012 | Chiang et al. |

FOREIGN PATENT DOCUMENTS

| | | |
|---|---|---|
| EP | 1 621 875 A1 | 2/2006 |
| EP | 2 015 806 A1 | 1/2009 |
| JP | 4127885 | 4/1992 |
| JP | 10-214641 A | 8/1998 |
| JP | 2001-054899 A | 2/2001 |
| JP | 2001144342 A | 5/2001 |
| JP | 2002-246670 A | 8/2002 |
| JP | 2005-108523 A | 4/2005 |

| | | | |
|---|---|---|---|
| JP | 2006-014562 A | 1/2006 | |
| SU | 1099127 A1 | 6/1984 | |
| WO | WO-95/15589 A1 | 6/1995 | |
| WO | WO-96/34417 A1 | 10/1996 | |
| WO | WO-2004/067066 A1 | 8/2004 | |
| WO | WO-2005/124918 A2 | 12/2005 | |
| WO | WO-2006/123329 A2 | 11/2006 | |
| WO | WO-2007/010522 A1 | 1/2007 | |
| WO | WO-2007/111880 A2 | 10/2007 | |
| WO | WO-2007/129317 A1 | 11/2007 | |
| WO | WO-2008/036122 A2 | 3/2008 | |
| WO | WO-2008/094196 A2 | 8/2008 | |
| WO | WO-2008/129549 A1 | 10/2008 | |
| WO | WO-2009/123672 A2 | 10/2009 | |

OTHER PUBLICATIONS

[No Author Listed] CODMAN 3000. Johnson & Johnson Company. 2 pages.

Barvosa-Carter et al., Solid-state actuation based on reversible Li electroplating. Smart Structures and Materials 2005: Active Materials: Behavior and Mechanics, Proceedings of SPIE. vol. 5761, 90-97.

Baughman, Conducting Polymer Artificial Muscles. Synthetic Metals. 1996;78:339-353.

Bruesewitz, Elektrochmische Aktoren. F&M Feinwerktechnik Mikrotechnik, Hanser, Munchen, DE. Jul. 1, 1998;106(7/08):527-30. German.

Che et al., An Electrochemically Driven Actuator Based on a Nanostructured Carbon Material. Anal. Chem. 1999;71:3187-3191.

Chin et al., Lithium Rechargeable Batteries as Electromechanical Actuators. Electrochemical and Solid State Letters. 2006;9(3):A134-38.

European Supplemental Search Report for EP 05758772.7 mailed Mar. 5, 2010.

Gu et al., V2O5 Nanofibre Sheet Actuators. Nature Materials. 2003;2:316-19.

International Preliminary Report on Patentability for Application Serial No. PCT/US2009/001075, filed Feb. 20, 2009, mailed Sep. 2, 2010.

International Preliminary Report on Patentability for International Application Serial No. PCT/US2005/020554 dated Mar. 4, 2008.

International Preliminary Report on Patentability for International Application Serial No. PCT/US2007/010036 dated Oct. 28, 2008.

International Preliminary Report on Patentability for International Application Serial No. PCT/US2007/016849 mailed Feb. 5, 2009.

International Search Report and Written Opinion for International Patent Application Serial No. PCT/US2005/020554, filed Apr. 26, 2007, mailed Feb. 7, 2008.

International Search Report and Written Opinion for PCT/US2007/010036, filed Apr. 26, 2007, mailed May 21, 2008.

International Search Report and Written Opinion for PCT/US2007/016849, filed Jul. 26, 2007, mailed Sep. 24, 2008.

International Search Report for International Patent Application Serial No. PCT/US2009/001075, filed Feb. 20, 2009, mailed May 25, 2010.

Invitation to Pay Additional Fees for PCT/US2011/065508 mailed Mar. 27, 2012.

International Search Report and Written Opinion for PCT/US2011/065508 mailed Jun. 8, 2012.

Koyama et al., Harnessing the Actuation Potential of Solid-State Intercalation Compounds. Adv Funct Mater. 2006;16:492-98.

Lin et al., Towards Electrochemical Artificial Muscles: A supramolecular Machine Based on a One-Dimensional Copper-Containing Organophosphonate System. Angew Chem Int Ed. 2004;43:4186-89.

Massey et al., Graphite intercalation compounds as actuation materials. 2004 Proceedings of IMECE04: 2004 ASME International Mechanical Engineering Congress and Exposition. 2004:117-22.

Massey et al., Reversible work by electrochemical intercalation of graphitic materials. Smart Structures and Materials 2005: Electroactive Polymer Actuators and Devices (EAPAD), Proceedings of SPIE. 2005;5759:322-30.

Niezrecki et al., Piezoelectric Actuation: State of the Art. The Shock and Vibration Digest. Jul. 2001;33(4):269-80.

Osborne, Valeritas' Insulin Patch Takes Aim At Type II Drug Resisters. BioWorld Financial Watch. 2006;14(36):1 page.

Paquette, et al., Ionomeric Electroactive Polymer Artificial Muscle for Naval Applications. IEEE Journal of Oceanic Engineering. 2004;29(3):729-37.

Prechtl et al., Design of a high efficiency, large stroke, electrochemical actuator. Smart Mater Struct. 1999;8:13-30.

Shahinpoor et al., Ionic Polymer-Metal Composites (IPMC) As Biomimetic Sensors and Actuators. Proceedings of SPIE's 5th Annual International Symposium on Smart Structures and Materials, Mar. 1-5, 1998, San Diego, CA. Paper No. 3324-27.

Spinks et al., Pheumantic Carbon Nanotube Actuators. Adv Mater. 2002;14(23):1728-32.

Takada et al., Electrochemical Actuator with Silver Vanadium Bronzes. Solid State Ionics. 1992;53-56:339-342.

Thomson, Moving Toward Morphing Vehicles. MIT TechTalk. Mar. 22, 2006;50(21):1-8.

Yamada et al., Optimized LiFePO4 for Lithium Battery Cathodes. Journal of the Electrochemical Society. Jan. 1, 2001;148(3):A224-229.

* cited by examiner

ELECTROCHEMICAL ACTUATOR

RELATED APPLICATIONS

This application is a continuation of U.S. patent application Ser. No. 12/960,224, filed Dec. 3, 2010, which is a continuation of U.S. patent application Ser. No. 11/881,830, filed Jul. 26, 2007, now U.S. Pat. No. 7,872,396, which is a continuation-in-part application of U.S. patent application Ser. No. 11/150,477, filed Jun. 13, 2005, now U.S. Pat. No. 7,541,715, which claims priority to U.S. Provisional Application Ser. No. 60/578,855, filed Jun. 14, 2004, and U.S. Provisional Application Ser. No. 60/621,051, filed Oct. 25, 2004, the contents of which applications are incorporated herein by reference. U.S. patent application Ser. No. 11/881,830 is also a continuation-in-part application of U.S. patent application Ser. No. 11/796,138, filed Apr. 26, 2007, now U.S. Pat. No. 7,994,686, which claims priority to U.S. Provisional Application Ser. No. 60/795,328, filed Apr. 26, 2006, the contents of which applications are incorporated herein by reference. U.S. patent application Ser. No. 11/881,830 also claims priority under 35 U.S.C. §119(e) to U.S. Provisional Application Ser. No. 60/833,412, filed Jul. 26, 2006, the contents of which application are incorporated herein by reference.

STATEMENT REGARDING FEDERALLY SPONSORED RESEARCH OR DEVELOPMENT

This invention was made with government support under Grant No. W911W6-05-C-0013 awarded by the U.S. Army. The government has certain rights in this invention.

FIELD OF THE INVENTION

The present invention provides systems, devices, and related methods, involving electrochemical actuation.

BACKGROUND OF THE INVENTION

Actuation generally refers to a mechanism by which an object, or portion of an object, can be adjusted or moved by converting energy (e.g., electric energy, chemical energy, etc.) into mechanical energy. Actuators may be categorized by the manner in which energy is converted. For example, electrostatic actuators convert electrostatic forces into mechanical forces.

Piezoelectric actuation provides high bandwidth and actuation authority but low strain (much less than 1% typically), and requires high actuation voltages. Shape memory alloys (SMAS), magnetostrictors, and the newly developed ferromagnetic shape-memory alloys (FSMAs) are capable of larger strain but produce slower responses, limiting their applicability. Actuation mechanisms that are based on field-induced domain motion (piezos, FSMAs) also tend to have low blocked stress. The above actuation methods are based on the use of active materials of high density (lead-based oxides, metal alloys), which negatively impacts weight-based figures of merit. Thus, there is a need for a technology capable of providing high actuation energy density, high actuation authority (stress), large free strain, and useful bandwidth.

Certain methods of actuation using electrochemistry have previously been described, wherein the load-bearing actuation materials are in gaseous or liquid phase and may be expected to have low elastic modulus and consequently low actuation energy density and actuation stress, compared to the approach of the present invention. Despite the observation of displacement, mechanical work has not been demonstrated.

Accordingly, improved methods and devices are needed.

SUMMARY OF THE INVENTION

The present invention relates to actuator systems constructed and arranged to be displaced from a first orientation to a second orientation comprising at least one electrochemical cell comprising a negative electrode and a positive electrode, wherein one or both of the negative and positive electrodes is an actuator, and comprises a first portion and a second portion, and wherein upon charge and/or discharge, a species is intercalated, de-intercalated, alloys with, oxidizes, reduces, or plates with the first portion to a different extent than the second portion, and experiences a resulting dimensional change relative to the second portion, thereby imparting to the actuator a differential strain between the first and second portions causing a displacement of at least a portion of the actuator, which actuator displacement does mechanical work without the need to be coupled to a structure which does said work.

The present invention also relates to actuator systems constructed and arranged to be displaced from a first orientation to a second orientation comprising at least one electrochemical cell comprising a negative electrode and a positive electrode, wherein one or both of the negative and positive electrodes is an actuator, and comprises a first portion and a second portion, and wherein upon charge and/or discharge, a species is intercalated, de-intercalated, or alloys with the first portion to a different extent than the second portion, and experiences a resulting dimensional change relative to the second portion, thereby imparting to the actuator a differential strain between the first and second portions causing a displacement of at least a portion of the actuator, which actuator displacement does mechanical work without the need to be coupled to a structure which does said work.

The present invention also relates to actuator systems constructed and arranged to be displaced from a first orientation to a second orientation comprising at least one electrochemical cell comprising a negative electrode and a positive electrode, wherein one or both of the negative and positive electrodes is an actuator, and comprises a first portion and a second portion, and wherein upon oxidation and/or reduction of the first portion to a different extent than the second portion, and experiences a resulting dimensional change relative to the second portion, thereby imparting to the actuator a differential strain between the first and second portions causing a displacement of at least a portion of the actuator, which actuator displacement does mechanical work without the need to be coupled to a structure which does said work.

The present invention also relates to actuator systems constructed and arranged to be displaced from a first orientation to a second orientation comprising at least one electrochemical cell comprising a negative electrode and a positive electrode, wherein one or both of the negative and positive electrodes is an actuator, and comprises a first portion and a second portion, and wherein upon charge and/or discharge, a species is electrochemically deposited at the first portion to a different extent than the second portion, and experiences a resulting dimensional change relative to the second portion, thereby imparting to the actuator a differential strain between the first and second portions causing a displacement of at least a portion of the actuator, which actuator displacement does mechanical work without the need to be coupled to a structure which does said work.

The present invention also relates to actuator devices comprising at least one electrochemical cell comprising a negative electrode, a positive electrode, and a species that can intercalate, de-intercalate, alloy with, oxidize, reduce, or plate with a first portion of the electrochemical cell to an extent different than a second portion of the electrochemical cell, the first and/or second portions thereby undergoing a dimensional change upon discharge causing actuator displacement which does mechanical work, wherein the electrochemical cell is constructed and arranged to be charged in manufacture, and is partially discharged after use or is not further charged after first discharge.

The present invention also relates to infusion pumps comprising at least one electrochemical cell comprising a negative electrode, a positive electrode, and an intercalation species, wherein the negative and/or positive electrode undergoes a dimensional change upon charge and/or discharge so as to cause infusion of a fluid into a body.

The present invention also relates to actuators constructed and arranged to be used in a physiological setting, the actuators comprising a first portion adjacent a second portion, wherein the first portion undergoes a dimensional change upon exposure to a bodily fluid comprising a species, and wherein resulting electrochemical intercalation of the species into the first portion, de-intercalation of the species from the first portion, or oxidation/reduction of the first portion as a result of contact with the species, imparts a dimensional change of the actuator.

The present invention also relates to electrochemical actuators for administering a drug into a body, the electrochemical actuators comprising at least one negative electrode, at least one positive electrode, and a species, wherein the electrochemical actuator is subjected to an applied voltage or current, whereby application of the voltage or current or cessation thereof includes intercalation of the species in at least one electrode of the electrochemical actuator, resulting in a volumetric or dimensional change of the electrochemical actuator, and wherein the volumetric or dimensional change results in administration of a drug into a body.

Figure 1A:
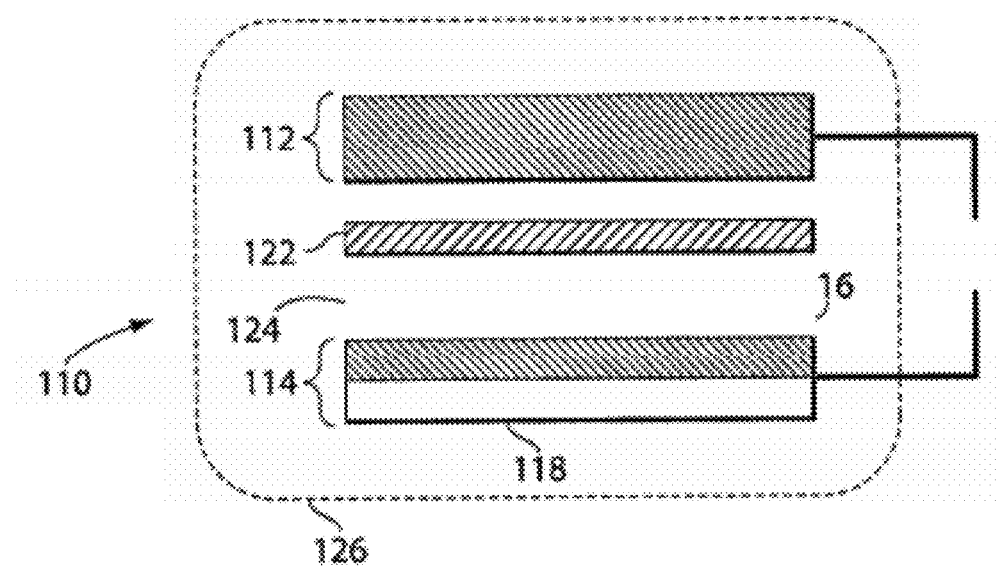
FIG. 1 shows an example of an actuator system (a) without application of a voltage or current and (b) with application of a voltage or current, according to one embodiment of the invention.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally provides systems and devices involving electrochemical actuation, and related methods.

In some cases, the present invention provides systems (e.g., actuator systems) that may comprise at least one component, wherein application of a voltage or current to the component may generate a volumetric or dimensional change of the component. In some cases, the volumetric or dimensional change may produce mechanical work. In some embodiments, at least a portion of the system may be constructed and arranged to be displaced from one orientation to another orientation. The system may also be associated with another structure, such that a volumetric or dimensional change of the system may affect the orientation, shape, size, volume, or other characteristic, of the structure. Systems such as these may be useful in various applications, including pumps (e.g., infusion pumps) and drug delivery devices, for example.

In some embodiments, the system may comprise a species associated with one or more components (e.g., electrodes) during operation of the system. The species, such as an ion, may be capable of interacting with one or more portions of the device. Some embodiments of the invention may involve interaction of a species with one or more electrodes of the device, generating a volumetric or dimensional change in the electrode. As used herein, a "volumetric or dimensional change" refers to the expansion, contraction, and/or other displacement of a system or portion of a system. The volumetric or dimensional change may comprise one or more amounts of expansion, contraction, elongation, shortening, twisting, bending, shearing, or other displacement in one or more dimensions. In some cases, the volumetric or dimensional change may be isotropic. In some cases, the volumetric or dimensional change may be anisotropic. Such changes may be employed for mechanical work, i.e., actuation. The systems may undergo any range of volumetric or dimensional changes that may be suitable for a particular application. For example, an actuator system may be positioned in contact with a fluid container and may expand and contract such that the system serves as a pumping device to dispense fluid from the fluid container.

In some embodiments, the present invention provides an electrochemical actuator comprising at least one electrochemical cell including an anode, a cathode, and a species (e.g., lithium ion), wherein the electrochemical cell undergoes a volumetric or dimensional change upon the application of a voltage or current. In some embodiments, the electrochemical actuator also comprises a structure including at least one portion constructed and arranged to be displaced from a first orientation to a second orientation, e.g., by the volumetric or dimensional change of the one, or plurality of electrochemical cells. As the portion of the structure is displaced, mechanical work is produced. As discussed in more detail below, a variety of systems can be actuated by the volumetric or dimensional change of an electrochemical cell.

As used herein, an actuator system "constructed and arranged to be displaced" refers to an actuator system that may alter the orientation of the system, i.e., through displacement (e.g., actuation) of at least a portion of the system, which affects the performance of the system or structure associated with the system in its intended purpose. Those of ordinary skill in the art would understand the meaning of this term. In an illustrative embodiment, an actuator system may be positioned adjacent a structure such as a fluid container or reservoir, wherein the actuator system is constructed and arranged such that motion or other displacement of the system affects the position, shape, size, or other characteristic of the fluid container to pump or dispense fluid from the fluid container.

Advantageously, displacement of a system, or a portion of a system, from a first orientation to a second orientation can be achieved through a variety of methods, e.g., bending, cupping, twisting, elongating, and contracting, which can be altered by, for example, varying the material composition of the system, the configuration of one or more electrochemical cells of the system, the voltage or current applied, the duty cycle, or other operating parameters, as described more fully below. In cases where the system is associated with a structure, displacement of the system may be altered by, for example, changing the positioning of the electrochemical cell in relation to the structure to be displaced, the shape of the structure, any materials in operative relationship between the cell and the structure, and/or the material compositions of the components. In some cases, the displacement may comprise a linear displacement of a portion of the system. In some cases, the displacement may comprise cupping of a portion of the system. For example, the system may comprise a disk-shaped portion that may have a first, planar orientation, and, upon actuation, the disk-shaped portion may be displaced via cupping to a nonplanar, hemispherical, second orientation.

Additionally, the degree of displacement of a structure, or a portion of a structure, can be tailored towards the particular application. For example, in some embodiments, electrochemical cells of the invention can cause displacement of a structure, or a portion of a structure, of, e.g., greater than 5 degrees, greater than 10 degrees, greater than 20 degrees, greater than 30 degrees, or greater than 40 degrees. Depending on the particular application, in other embodiments, electrochemical cells can cause displacement of, e.g., greater than 1 cm, greater than 10 cm, greater than 20 cm, greater than 50 cm, or greater than 1 m.

In some cases, the volumetric or dimensional displacement of an electrochemical cell upon charging or discharging may be used to carry out a physical displacement of the system, a portion of the system, or a structure adjacent or otherwise associated with the system. The volumetric or dimensional displacement (e.g., net volume change) may be positive, zero, or negative during charge and/or discharge. In some cases, the net volume change and may be readily computed from the volume changes occurring in each of the constituent materials using tabulated data for the molar volumes of the constituent materials of the cell as a function of their composition or state-of-charge, or measured directly on the electrochemical cell.

Several different structures can be actuated by an electrochemical cell described herein. In some embodiments, the invention provides actuator systems (e.g., electrochemical actuators) constructed and arranged to be displaced from first orientation to a second orientation, upon charge or discharge. In some cases, the actuator system may be constructed and arranged to be altered from a first shape to a second shape, upon charge or discharge. In some cases, the displacement produced by the actuator may have the same sign (e.g., positive, negative) as the volumetric or dimensional change occurring in the electrochemical cell. For example, a positive displacement (e.g., increase in a linear dimension) may correspond to a positive net volume change (e.g., expansion) of the electrochemical cell itself, and a negative displacement (decrease in a linear dimension) may correspond to a negative net volume change (contraction) of the electrochemical cell itself. In some cases, the displacement produced by the actuator may not have the same sign as the volumetric or dimensional change occurring in the electrochemical cell. For example, as described in the Examples, a positive displacement may be produced by an electrochemical cell undergoing a net negative volume change. That is, the displacement of the actuator may be decoupled from the volumetric or dimensional change of the electrochemical cell.

The actuator system can include at least one electrochemical cell comprising a negative electrode and a positive electrode. The actuator system may also include, for example, greater than or equal to 2, greater than or equal to 4, greater than or equal to 10, greater than or equal to 20, or greater than or equal to 50 electrochemical cells that can be operated in series or parallel. In some embodiments, multiple electrochemical cells may be joined in parallel electrically but may be stacked in order to increase overall displacement while maintaining a low overall device voltage. In some embodiments the net volume change of the electrochemical actuator is used to perform a physical displacement resulting in the pumping or dispensing of a fluid, or the administration of a fluid to a body, including but not limited to a fluid comprising a drug.

In some embodiments, one or both of the negative and positive electrodes may be an actuator and can change shape and/or be displaced from a first orientation to a second orientation, upon charge or discharge of the electrochemical cell. In some cases, the actuator system can comprise a first portion and a second portion, optionally in electrical communication with one another, wherein the first portion and a second portion undergo a differential volumetric or dimensional change, or differential displacement, upon charge or discharge. For example, the electrode(s) undergoing shape change or displacement may comprise a first portion that imposes a mechanical constraint on a second portion that may facilitate displacement of the electrode(s). In some embodiments a first portion is in electrical communication with a second portion. In some embodiments a first portion is not in electrical communication with a second portion.

In some instances, a first portion and a second portion (e.g., corresponding to positive and negative electrodes, respectively or vice versa, of the electrochemical cell) may be in the form of layers, which may be positioned immediately adjacent one another, or in other embodiments, can be separated from one another by another material. In some embodiments, the first and second portions are bonded to one another. In some embodiments, the first and second portions are different regions of the same part of the system, wherein one portion undergoes electrochemically induced volumetric or dimensional change to a greater extent than the other.

In some embodiments, upon charge and/or discharge, a species (e.g., an intercalation species, an electron, or a plating species) intercalates, de-intercalates, alloys with, oxidizes, reduces, or plates with or into the first portion to a different extent (e.g., to a different degree, concentration, strain, volume, shape change, or other change) than the second portion. For example, the species may substantially intercalate, de-intercalate, or alloy with, oxidize, reduce, or plate the first portion, but not with the second portion, or with the second portion to a lesser extent than the first portion. As a result of the differential intercalation, de-intercalation, or alloying, oxidation, reduction, or plating of the first portion to a different extent than the second portion, the first portion may experience a resulting dimensional change, such as an increase or decrease in volume or a linear dimension or a change in aspect ratio. Because the second portion does not intercalate, de-intercalate, or alloy with, oxidize, reduce, or plate the species, or does so to a lesser extent than the first portion, the second portion may not undergo a substantial dimensional change, or may not undergo the same dimensional change as the first portion. As a result, a differential strain (e.g., an opposing strain) is imparted between the first and second portions, which can cause a displacement (e.g., internal flexure or bending) of at least a portion of the actuator. The resulting displacement of the actuator can do mechanical work without the need to be coupled to a structure which does said work. In certain embodiments of the invention, actuation of an actuator can include expansion, contraction, bending, bowing, cupping, folding, rolling, or other forms of displacement from a first orientation to a second orientation.

In some cases, the actuator system may itself be a strain-amplifying or strain-deamplifying structure. For example, the actuator system, or portion thereof (e.g., an electrode), may amplify any displacement arising from, for example, a volume change that occurs in the system, or portion thereof. In some embodiments, the actuator system or device may amplify displacement arising from a volumetric change of an electrode. Displacement of the actuator may be used to exert a force or to carry out a displacement of a structure adjacent the actuator.

For any of the actuator systems and devices (e.g., pumps) described herein, while displacement of the actuator system, or portion thereof, can be used to perform mechanical work without the need to be coupled to a structure which does said work, in some cases, the actuator system may be coupled to a structure which does mechanical work (e.g., a strain-amplifying structure, a strain de-amplifying structure). In some cases, the actuator system may not be coupled to a structure which does mechanical work.

An example of an actuator system is shown in the embodiment illustrated in FIG. 1A. As shown in this illustrative embodiment, actuator system 110 includes a negative electrode 112 in electrical communication with positive electrode 114. Positive electrode 114 may include a first portion 116 and a second portion 118. In some embodiments, portions 116 and 118 are formed of different materials. Portions 116 and 118 may also have different electrical potentials. For example, portion 116 may comprise a material that can intercalate, de-intercalate, alloy with, oxidize, reduce, or plate a species to a different extent than portion 118. Portion 118 may be formed of a material that does not substantially intercalate, de-intercalate, or alloy with, oxidize, reduce, or plate the species. In some cases, portion 116 may be formed of a material comprising one or more of aluminum, antimony, bismuth, carbon, gallium, silicon, silver, tin, zinc, or other materials which can expand upon intercalation or alloying or compound formation with lithium. In one particular embodiment, portion 116 is formed of a material comprising aluminum, which can expand upon intercalation with lithium. Portion 118 may be formed of copper, since copper does not substantially intercalate or alloy with lithium. In some instances, portion 118 may act as a positive electrode current collector, and may extend outside the electrochemical cell, e.g., to form a tab or current lead. In other embodiments, portion 118 may be joined to a tab or current lead that extends outside the cell. Negative electrode 112 may also include a current collector. Actuator system 110 may include separator 122. The separator may be, for example, a porous separator film, such as a glass fiber cloth, or a porous polymer separator. Other types of separators, such as those used in the construction of lithium ion batteries, may also be used. The actuator may also include electrolyte 124, which may be in the form of a liquid, solid, or a gel. The electrolyte may contain an electrochemically active species, such as that used to form the negative electrode. Actuator system 110 may be sealed an enclosure 126, such as a polymer packaging.

Figure 1B:
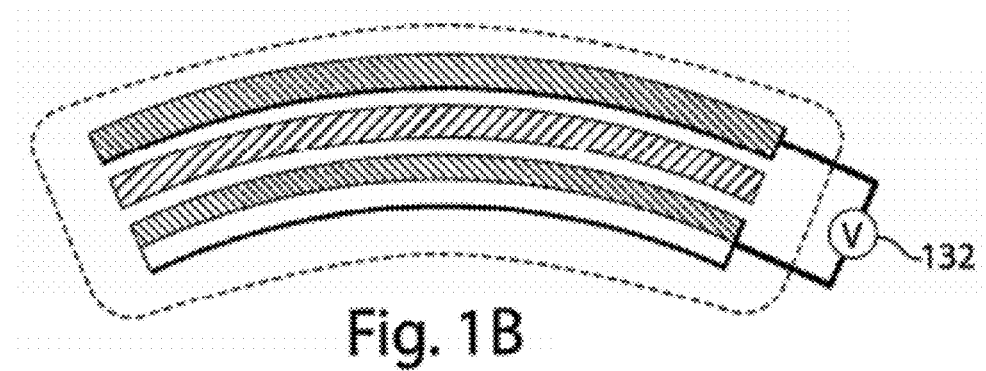

As illustrated in the embodiment shown in FIG. 1B, the electrochemical cell may have a voltage 132, such that, when a closed circuit is formed between the negative and positive electrodes, an electronic current may flow between the two electrodes through the external circuit. If negative electrode 112 is a lithium metal electrode and the electrolyte contains lithium ions, lithium ion current can flow internally from electrode 112 to electrode 114. The intercalation of portion 116 with lithium can result in a dimensional change, such as a volume expansion. In some instances, this volume expansion may reach at least 25%, at least 50%, at least 75%, at least 100%, at least 150%, at least 200%, at least 250%, or at least 300% compared to the initial volume. High volume expansion may occur, for example, when portion 116 is saturated with lithium. As portion 116 increases in volume due to intercalation of lithium, portion 118 to which portion 116 may be bonded, may not substantially expand due to minimal or no intercalation of lithium. Portion 116 thus provides a mechanical constraint. This differential strain between the two portions causes positive electrode 114 to undergo bending or flexure. As a result of the dimensional change and displacement of the positive electrode, actuator system 110 can be displaced from a first orientation to a second orientation. This displacement can occur whether the volumetric or dimensional change (e.g., net volume change) of the electrochemical cell, due to the loss of lithium metal from the negative electrode and formation of lithium intercalated compound or lithium alloy at the positive electrode, is positive, zero, or negative. In some cases, the actuator displacement may occur with a volumetric or dimensional change (e.g., net volume change) of the actuator system, or portion thereof, that is positive. In some cases, the actuator displacement may occur with a volumetric or dimensional change (e.g., net volume change) of the actuator system, or portion thereof, that is zero. In some cases, the actuator displacement may occur with a volumetric or dimensional change (e.g., net volume change) of the actuator system, or portion thereof, that is negative.

As used herein, "differential strain" between two portions refers to the difference in response (e.g., actuation) of each individual portion upon application of a voltage or current to the two portions. That is, a system as described herein may include a component comprising a first portion and a second portion associated with (e.g., may contact, may be integrally connected to) the first portion, wherein, under essentially identical conditions, the first portion may undergo a volumetric or dimensional change and the second portion does not undergo a volumetric or dimensional change, producing strain between the first and second portions. The differential strain may cause the component, or a portion thereof, to be displaced from a first orientation to a second orientation. In some cases, the differential strain may be produced by differential intercalation, de-intercalation, alloying, oxidation, reduction, or plating of a species with one or more portions of the actuator system.

For example, the differential intercalation, de-intercalation, alloying, oxidation, reduction, or plating of portion 116 relative to portion 118 can be accomplished through several means. (FIG. 1A) In one embodiment, as described above, portion 116 may be formed of a different material than portion 118, wherein one of the materials substantially intercalates, de-intercalates, alloys with, oxidizes, reduces, or plates a species, while the second portion interacts with the species to a lesser extent. In another embodiment, portion 116 and portion 118 may be formed of the same material. For example, portion 116 and portion 118 may be formed of the same material and may be substantially dense, or porous, such as a pressed or sintered powder or foam structure. In some cases, to produce a differential strain upon operation of the electrochemical cell, portion 116 or 118 may have sufficient thickness such that, during operation of the electrochemical cell, a gradient in composition may arise due to limited ion transport, producing a differential strain. In some embodiments, one portion or an area of one portion may be preferentially exposed to the species relative to the second portion or area of the second portion. In other instances, shielding or masking of one portion relative to the other portion can result in lesser or greater intercalation, de-intercalation, or alloying with the masked or shielded portion compared to the non-masked or shielded portion. This may be accomplished, for example, by a surface treatment or a deposited barrier layer, lamination with a barrier layer material, or chemically or thermally treating the surface of the portion to be masked/shielded to either facilitate or inhibit intercalation, de-intercalation, alloying, oxidation, reduction, or plating with the portion. Barrier layers can be formed of any suitable material, which may include polymers, metals, or ceramics. In some cases, the barrier layer can also serve another function in the electrochemical cell, such as being a current collector. The barrier layer may be uniformly deposited onto the surface in some embodiments. In other cases, the barrier layer may form a gradient in composition and/or dimension such that only certain portions of the surface preferentially facilitate or inhibit intercalation, de-intercalation, alloying, oxidation, reduction, or plating of the surface. Linear, step, exponential, and other gradients are possible. In some embodiments a variation in the porosity across portion 116 or 118, including the preparation of a dense surface layer, may be used to assist in the creation of an ion concentration gradient and differential strain. The invention also contemplates other methods of interaction of a species with a first portion to a different extent so as to induce a differential strain between the first and second portions. In some embodiments, the flexure or bending of an electrode is used to exert a force or to carry out a displacement that accomplishes useful function, as described in more detail below.

In several embodiments described herein, the first and second portions may be described as being formed of different materials, resulting in different characteristics and properties. It should be understood that, for any embodiments described herein, the first portion and the second portion may also be formed of substantially the same material. In cases where the first portion and the second portion may be formed of the same material, the first and second portions may optionally have at least one differing characteristic, such as dimension, thickness, porosity, or the like, which may produce differential intercalation, de-intercalation, alloying, oxidation, reduction, or plating, resulting in differential strain. For example, the first and second portions may comprise the same material but may have different porosities, resulting in a porosity gradient along the first and second portions. In some cases, the first portion may comprise a porous material (e.g., powder compact, foam) having a first density, and the second portion may comprise the porous material having a second density different than the first density.

As described herein, some embodiments of the invention involve interaction of a species with one or more electrodes. For example, the electrode(s) may be intercalated with the species. In some embodiments, during operation of the actuator system or device, one electrode may obtain a spatially-varying concentration of the species, resulting in a differential strain, producing displacement of at least a portion of the system or device. That is, the species may be, for example, intercalated into one portion of the electrode to a greater extent than into a second portion of the electrode, resulting in differential strain.

Actuators of the invention, or portions thereof (e.g., electrodes), especially those that include at least a first portion that can intercalate, de-intercalate, alloy with, oxidize, reduce, or plate a species to a different extent than a second portion, can have any suitable shape such as a plate, sheet, strip, folded sheet or strip, beam, cup, rod, tube, cylinder, etc., so long as it can be displaced from a first orientation to a second orientation, which can be used for accomplishing a desired function. In some cases, at least a portion of the actuator may perforated, and/or may have multiple "legs" or "arms" or branches. In some cases, the positive and/or negative electrode is nonplanar. For example, the positive and/or negative electrode can be a plate or pellet, or other nonplanar shape. In some embodiments, the positive and/or negative electrode may have any shape and may comprises at least one groove, wherein the groove(s) may facilitate and/or guide displacement of the actuator system, or portion thereof. For example, an electrode may be grooved or embossed so as to facilitate, guide, or direct the manner in which the electrode is moved from a first orientation to a second orientation. In some cases, the electrode may fold along at least one groove upon actuation.

Actuators of the invention can range in size from the nanometer scale, to the micrometer scale, and to the macroscopic scale. For example, in some embodiments, actuator system 110 may have at least one dimension less than or equal to 1 meter, less than or equal to 10 centimeters, less than or equal to 1 centimeter, less than or equal to 1 millimeter, less than or equal to 100 microns, less than or equal to 10 microns, less than or equal to 1 micron, less than or equal to 100 nanometers, or less than or equal to 10 nanometers.

An electrode of an actuator can also range in size from the nanometer scale, to the micrometer scale, and to the macroscopic scale. For example in some embodiments, electrode 114 may have at least one dimension less than or equal to 1 meter, less than or equal to 10 centimeters, less than or equal to 1 centimeter, less than or equal to 1 millimeter, less than or equal to 100 microns, less than or equal to 10 microns, less than or equal to 1 micron, less than or equal to 100 nanometers, or less than or equal to 10 nanometers.

Actuators (including electrodes) that include a first portion that can intercalate, de-intercalate, alloys with, oxidize, reduce, or plate with a species to a different extent than a second portion may be formed of any suitable material in any suitable form that allows interaction with said species (e.g., a dimensionally-active material). In some embodiments, the first portion is formed of a porous material that changes dimension upon ion exchange. The change in dimension may be a relatively uniform volume expansion or contraction, or may be a flexure or bending or cupping mode of deformation resulting from introduction of differential strain, as described herein. The porous material may be a pressed powder compact or metal foam or composite of the dimensionally-active material. The second portion may be formed of a non-dimensionally active material. The first and second portions may optionally comprise additives such as a binder or conductive additive such as carbon or a metal. The dimensionally-active material may comprise, for example, one or more of the following species: Al, Au, Ag, Ga, Si, Ge, Ti, Sn, Sb, Pb, Zn, carbon, graphite, hard carbon, mesoporous carbon, an oxide, intercalation oxide, layered oxide, clay mineral, sulfide, layered sulfide, $TiS_2$, $MoS_2$, and $WS_2$. It should be understood that actuators of the invention may also comprise other metals, metal-containing compounds, inorganic materials, and the like.

In some cases, actuators of the invention may undergo a dimensional change provided by a porous electrode that changes dimension upon ion exchange. In some cases, the porous electrode, upon charge or discharge, undergoes a dimension change comprising bending, flexing, or cupping. In some embodiments, the porous electrode may comprise a porosity gradient, wherein a first portion of the porous electrode has a porosity that is different than the porosity of a second portion of the porous electrode. In some cases, the porous electrode further comprises a surface layer in contact with the porous electrode, wherein the surface layer is intercalated, de-intercalated, alloyed with, oxidized, reduced, or plated to a greater extent than the (underlying) porous electrode. The surface layer may partially or substantially cover or encapsulate the outer surface of the porous electrode, such that the surface layer may be primarily and/or directly exposed to other components of the system. In some cases, the surface layer may be intercalated or alloyed to a greater extent than the underlying porous electrode. In some cases, the surface layer may have a higher density then the underlying porous electrode.

In some cases, a species that can intercalate, de-intercalate, alloyed with, oxidize, reduce, or plate at least a portion of an actuator (e.g., a portion of an electrode) may be in the form of an ion. Non-limiting examples of ions include a proton, hydroxide ion, sulfate ion, chlorate ion, phosphate ion, and a nitrate ion. In other cases, the species may comprise an alkali metal or an alkaline earth metal. In certain embodiments, the species is an electron, which can cause oxidation or reduction of at least a portion of a surface. In other embodiments, the species is a plating species, which can be electrochemically deposited at the first portion to a different extent than the second portion. In some cases, the species may be selected from the group consisting of a proton, alkali ion, lithium, ion complex, hydroxyl ion, carbonate ion, chlorate ion, sulfate ion, phosphate ion, other multi-atomic ion complexes, and the like. In some cases, the species is selected from the group consisting of a proton, alkali ion, ion complex, hydroxyl ion, carbonate ion, chlorate ion, sulfate ion, and phosphate ion. In some cases, the species is a proton.

The species may be initially present in an electrochemical cell in the form of a solid, such as the material used to form the active species of the positive or negative electrodes. In other cases, the species may be in the form of a solid that is laminated to one of the electrodes, but is not a part of the active material of the electrode. In another embodiment, the species may be in the form of a separate solid ion source, such as a solid electrolyte. In yet another embodiment, the species may be present in the form of a liquid or a gel, e.g., as an electrolyte, and may be present in the electrochemical cell before first charge/discharge of the cell. In other embodiments, these species may be present in a substance exterior to the electrochemical cell. For instance, the species may be present in the environment in which the actuator is used. In one particular embodiment, the actuator is designed to be immersed in a fluid containing a species that can intercalate, alloy with, oxidize, reduce, or plate a portion of an electrode of the electrochemical cell. For example, the fluid may be a bodily fluid and the species may be an ionic species present in the bodily fluid.

In some cases, a device of the invention may comprise an anode, cathode, and lithium ions as the species. Upon application of an electric field between the anode and the cathode, the device may be reversibly charged and discharged. In some cases, upon charging, the lithium ions may insert into the anode such that the anode undergoes a volumetric or dimensional change relative to the cathode, which remains essentially unchanged in volume or dimension. Upon discharging, the lithium ions may be transported from the anode to the cathode such that the lithium ions are inserted into the cathode. As a result, the anode may return to its volume/shape prior to charging, and the cathode may undergo a volumetric or dimensional change relative to the anode. In some cases, both the anode and cathode, either simultaneously or non-simultaneously, may undergo a volumetric or dimensional change upon charge/discharge cycling. In some cases, only one of the anode and cathode may undergo a volumetric or dimensional change upon charge/discharge cycling.

Actuators of the invention can be used in a variety of applications. For example, actuators can be used in microfluidic devices, in which, for example, switching and valving functions can be performed by the actuator. In other cases, the actuator may be used as a pump to cause fluid flow in a channel or out of an orifice, including a pump for the controlled delivery of a drug. In other embodiments, an actuator can be part of an external or implantable medical device. The species that may intercalate, de-intercalate, oxidize, reduce, or plate with at least a portion of the actuator (e.g., a portion of an electrode) may be part of the electrochemical cell in some embodiments (e.g., in manufacture before being used); however, in other embodiments may be a constituent of the environment in which the actuator is used. Actuators may also be part of micro electro mechanical systems (MEMS) devices such as micromirror arrays in which addressable micro actuators are individually actuated. In other cases, one or more actuators can be constructed and arraigned to unfold into a structure upon application of a current or voltage. Such structures may be useful as tents or scaffolds, for example. In other cases, an actuator of the invention can be a component of a surgical tool or medical implant that can be electrically expanded or contracted by an electrical input. A variety of applications are described in more detail below.

Figure 2A:
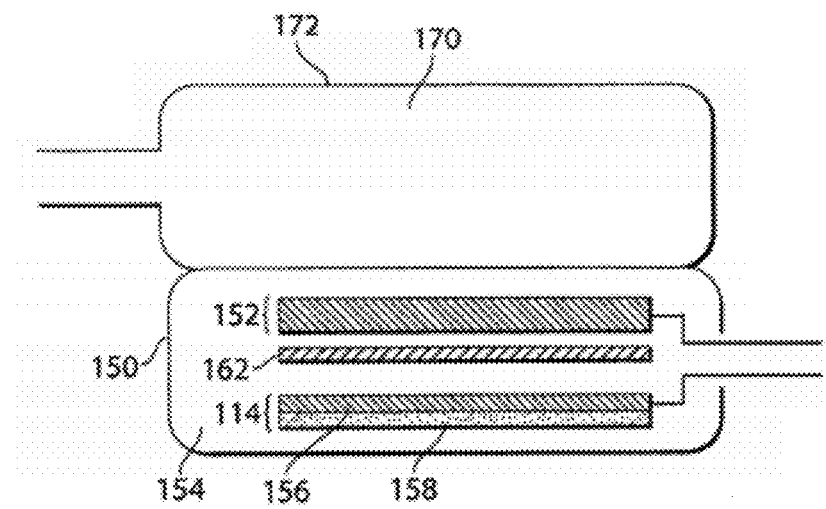
FIG. 2 shows an example of an actuator system (a) without application of a voltage or current and (b) with application of a voltage or current, for dispensing a fluid in an adjacent fluid container, according to one embodiment of the invention.
Figure 2B:
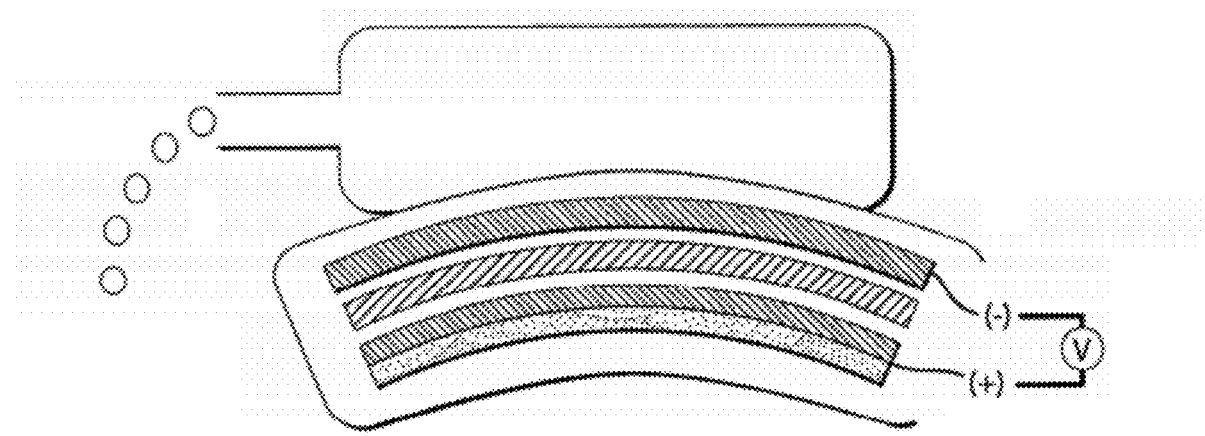

In some embodiments, actuators of the invention may be used to displace or deform a structure adjacent the actuator. For example, as shown in the embodiment illustrated in FIG. 2A, actuator system 150 includes actuator 151 that serves as a pump to dispense fluid 170 from reservoir 172. The pump may dispense different volumes of fluids, for example, greater than 0.01 mL, greater than 0.01 mL, greater than 1 mL, greater than 5 mL, greater than 10 mL, greater than 100 mL, greater than 1 L. Actuator 151 may operate in a similar manner to actuator 110 described in FIG. 1. Briefly, a species may intercalate, de-intercalate, alloy, oxidize, reduce, or plate with first portion 156 of electrode 154 in a non-uniform manner relative to portion 158, such that a differential strain is induced between the first and second portions. The second portion may be a mechanical restraint, which causes flexure or bending of electrode 154, and resultantly, flexure or bending of actuator 151. Reservoir 172 adjacent actuator 151 may be formed of a deformable material such that flexure of actuator 151 causes an increase in pressure inside the reservoir, forcing fluid 170 to be dispensed from the reservoir, as shown in FIG. 2B. In some embodiments, the rate of dispensing or infusion of fluid 170 from the reservoir can be controlled by the rate and/or extent of displacement (e.g., stroke length) of the actuator from a first position to a second position. The rate of dispensing may be controlled such that is constant or variable. The rate and/or extent of actuation may be controlled by parameters such as the amplitude and/or duration of the applied current or voltage (e.g., during charge or discharge), concentration of species to be intercalated, de-intercalated, alloyed, or plated with an electrode of the electrochemical cell, and the dimensions and material compositions of the materials used to form the electrochemical cell, such as the configuration and material compositions of the first and second portions of the actuator, which interact with the species to different extents.

One or more electrochemical cells may be arranged, optionally in combination with one or more components, to achieve displacement of a system, or a portion of a system. In some cases, electrochemical cells having different actuation abilities may be arranged on a surface in a pattern, wherein each electrochemical cell is independently controlled. Other configurations of cells, components, and/or devices may be used in the context of the invention, as described in, for example, U.S. Patent Publication No. 2006/0102455, which is based on U.S. patent application Ser. No. 11/150,477, and International Publication No. WO2005/124918, which is based on International Application Serial No. PCT/US/2005/020554, both of which are incorporated herein by reference.

Actuators of the invention can be fabricated with different stiffness of materials to allow for different ranges of actuation rate and stroke length. For example, an actuator having a long stroke length may be formed of one or more materials having a relatively low stiffness. In such an embodiment, a short pulse of current can cause slow displacement of an actuator from a first orientation to a second orientation. In contrast, an actuator formed of one or more stiffer materials may be displaced only when current is applied. In such an embodiment, the actuator can be displaced from a first orientation to a second or third orientation with each increment of applied current, in some instances, without regard to the load. In some embodiments, the transfer of energy from the actuator to a mechanical system is maximized when the stiffness of the actuator and the mechanical systems are matched. Accordingly, the choice of materials of the actuator can be chosen based on the particular application and/or the mode of actuation desired.

Figure 3A:
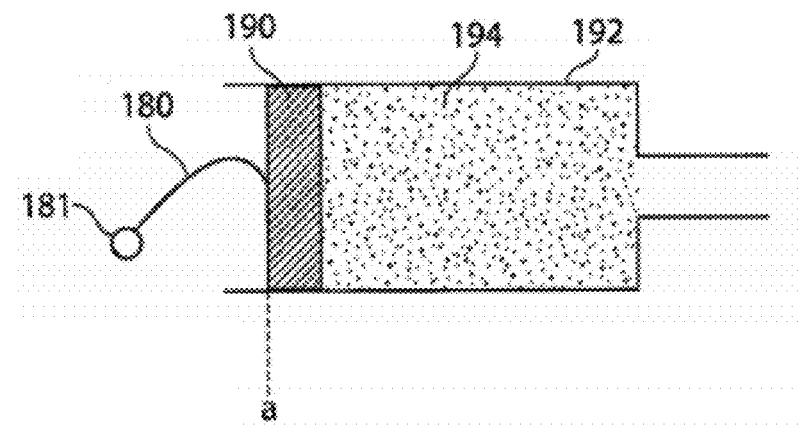
FIGS. 3A-C show an actuator system having sufficient stiffness to affect the rate of displacement and the stroke length of the actuator.
Figure 3B:
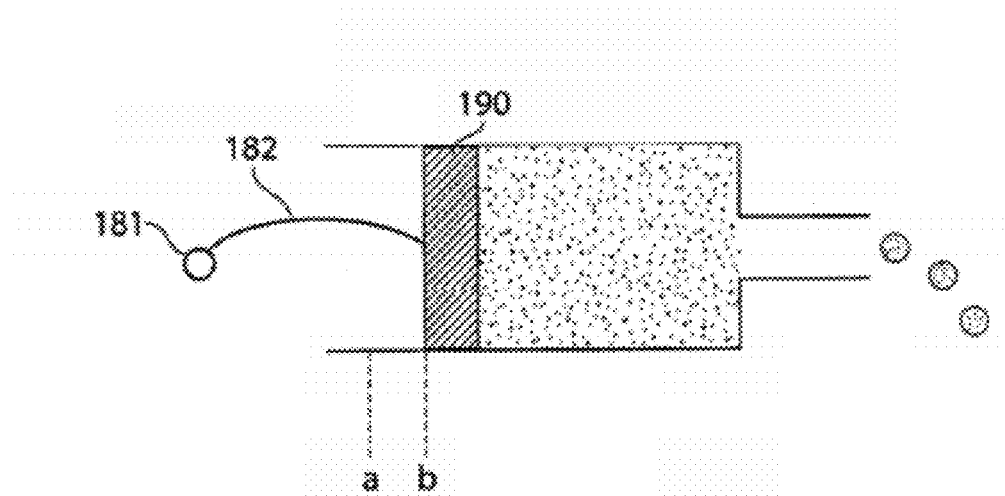
Figure 3C:
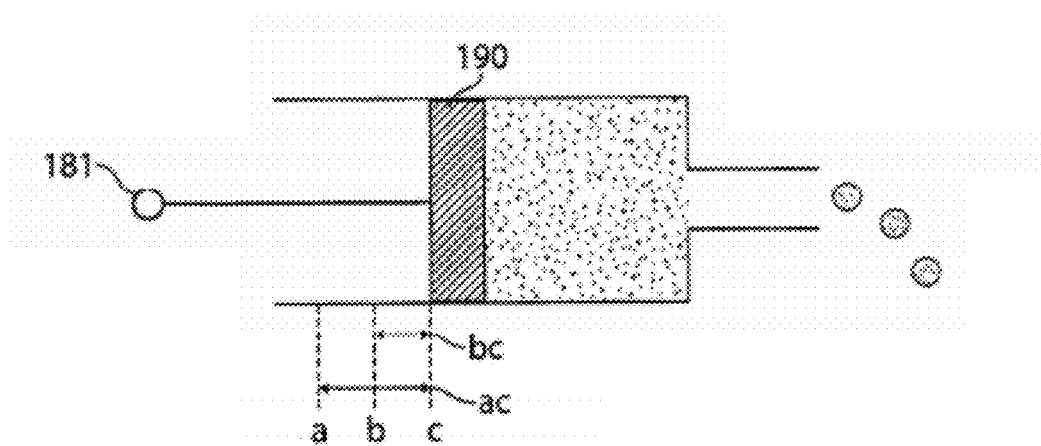

FIGS. 3A-C show an example of how the stiffness of an actuator can influence the rate of displacement and the stroke length of the actuator. In the embodiment illustrated in FIG. 3A actuator 180 includes a first portion that can intercalate, de-intercalate, alloy with, oxidize, reduce, or plate a species to an extent different than a second portion. End 181 of the actuator may be fixed in a position, with the actuator in a first position a. The actuator may be adjacent a piston 190 and reservoir 192 containing fluid 194. Upon non-uniform intercalation, de-intercalation alloying, oxidation, reduction, or plating of a species (e.g., with the first portion with respect to the second portion of the actuator), actuator 180 may be displaced from position a to position c, as shown in FIG. 3C. Actuator 180 may be formed of one or more materials having a low stiffness to achieve a long stroke length "ac". This may be achieved, for example, by applying a short pulse of current to the actuator such that the actuator is displaced, which can cause displacement of piston 190, to dispense the fluid from the reservoir. A short pulse of current may slowly push the fluid out of the reservoir until the actuator relaxes to its new equilibrium position c. In contrast, FIG. 3B shows actuator 182 formed of a high stiffness material in a first orientation, where an end of the actuator is at position b. Upon application of a current of similar magnitude and duration as that to actuator 180, actuator 182 may be displaced from position b to position c, as shown in FIG. 3C. The stroke length of actuator 182, "bc," is shorter than the stroke length of actuator 180, "ac," due to the different stiffness of the materials used to form actuators 180 and 182. In some embodiments, actuators can be stacked, e.g., either in parallel or in series, to increase the load or force applied to a structure.

The following examples further illustrate different configurations and ways in which actuators of the invention can be implemented.

Figure 4:
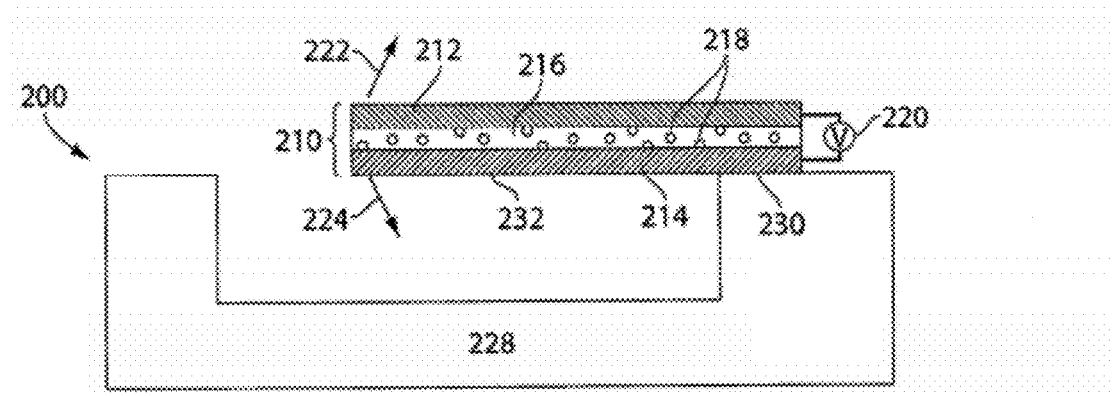
FIG. 4 shows an example of an actuator system, according to one embodiment of the invention.

In the embodiment illustrated in FIG. 4, actuator system 200 includes actuator 210 including positive electrode 212, negative electrode 214, and electrolyte layer 216 including species 218 that can intercalate, de-intercalate, alloy with, oxidize, reduce, or plate with the positive or negative electrode. The transport of the species through the electrolyte layer under applied voltage 220 can be used to displace actuator 210 up or down in the directions of arrows 222 and 224. This displacement can result in actuation that, for example, can be used to open or close a valve, displace a mirror, pump, fluid, etc. As discussed above, the combinations of materials used to form the positive and negative electrodes can vary. For instance, suitable materials may include the active materials in a lithium ion or nickel-metal hydride battery. As illustrated in this embodiment, actuator system 210 is fixed at one end to substrate 228. The substrate can act as a mechanical constraint such that portion 230 of the actuator undergoes minimal or no displacement. Because portion 232 of the actuator is not fixed, this portion undergoes displacement which results in bending.

Figure 5:
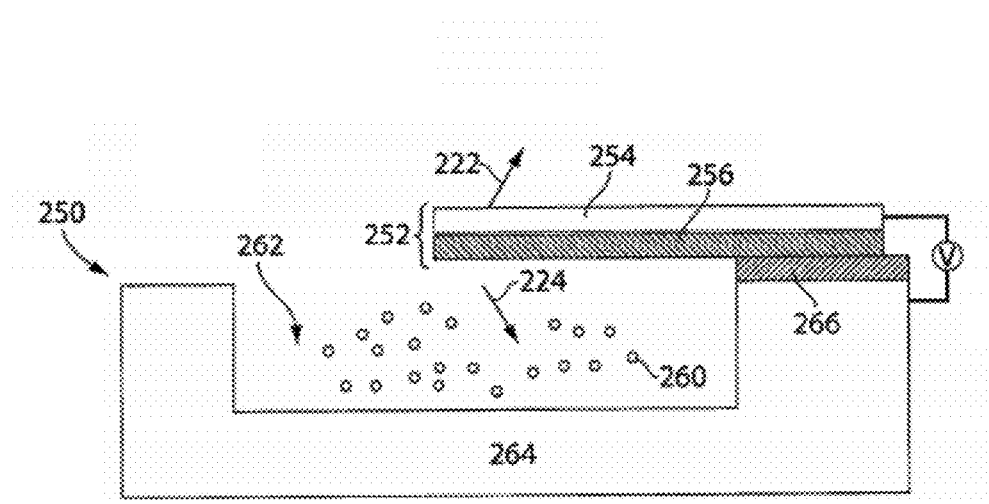
FIG. 5 shows another example of an actuator system, according to one embodiment of the invention.

In another embodiment, the species that can intercalate, alloy with, oxidize, reduce, or plate with a portion of an actuator can be positioned such that one portion of the actuator is preferentially exposed to the species, while a different portion of the actuator is non-exposed, or exposed to the species to a lesser extent. For example, in the embodiment illustrated in FIG. 5, actuator system 250 includes actuator 252 comprising portion 254 and portion 256. Portion 256 may be exposed to species 260, which is immersed in substance 262 (e.g., an electrolyte) to a greater extent than portion 254. Portion 254 and substrate 264 may be conductive and serve as the positive and negative electrodes. Portion 256 may be insulated from substrate 264 by insulator 266. Upon application of a potential difference between the substrate (or a remote counter electrode) and portion 254, species 260 may intercalate, de-intercalate, alloy with, oxidize, reduce, or plate portion 256 to an extent greater than portion 254. The type of interaction of portions 254 and/or 256 with species 260 will depend on, for example, the particular type of species, and the materials used to form portions 254 and 256. This interaction can cause flexure of actuator 252 as a result of the differential strain between portions 254 and 256.

Structures such as actuator systems 200 and 250 may be fabricated by a wide variety of methods including MEMS fabrication, various method of deposition of thin film structures, thick film coating technology, electrode deposition methods, and physical assembly and lamination. Other methods of fabrication may also be suitable and are known to those of ordinary skill in the art.

Figure 6:
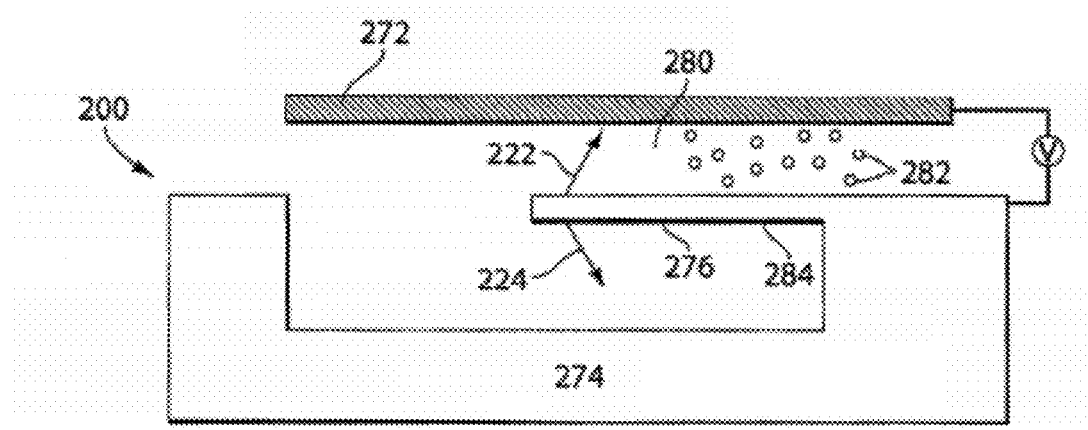
FIG. 6 shows another example of an actuator system, according to one embodiment of the invention.

As shown in the embodiment illustrated in FIG. 6, actuator system 270 includes electrode 272 in electrical communication with actuator 276, which may be integrally connected (or non-integrally connected) to substrate 274. Actuator 276 may be uniform in composition; however, portion 280 may be exposed to species 282 to a larger extent than portion 284 of the actuator. Different exposure (e.g., different areas of exposure) to the species can cause intercalation, de-intercalation, alloying, oxidation, reduction, or plating with portion 280 to a different extent than portion 284. This can cause actuation of the actuator, e.g., in the direction of arrows 222 and 224.

In some embodiments, actuators of the invention are constructed and arranged to be used in a physiological setting, such as within a body. For example, some embodiments of the invention provide electrochemical actuators for administering a drug into a body, comprising at least one negative electrode, at least one positive electrode, and a species as described herein, wherein the electrochemical actuator may be subjected to an applied voltage or current, whereby application of the voltage or current or cessation thereof includes intercalation of the species in at least one electrode of the electrochemical actuator, resulting in a volumetric or dimensional change of the electrochemical actuator. In some cases, the volumetric or dimensional change may be useful in the administration of a drug into a body, or a fluid comprising a drug into a body, for example, via dispensing or infusing methods, and other methods, as described herein.

In some instances, the actuator is immersed a bodily fluid (e.g., blood, urine, sweat, etc.) comprising a species that can intercalate with a portion of an electrode of the actuator. Upon intercalation, the electrode may undergo displacement from a first orientation to a second orientation. In other embodiments, species may de-intercalate from a portion of the electrode into the body upon exposure to the bodily fluid. Or in other embodiments, the species may oxidize or reduce a portion of the electrode upon exposure to the bodily fluid, which can result in displacement. In other instances, the actuator may be used outside of the body, for example, the actuator may be exposed to a bodily fluid removed from a body.

Figure 7:
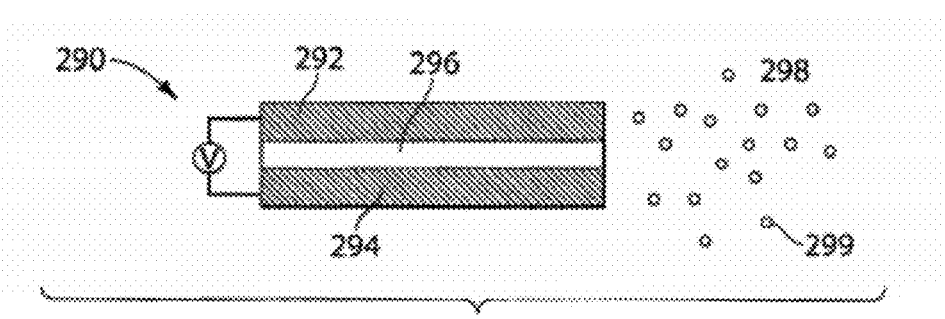
FIG. 7 shows another example of an actuator system, according to one embodiment of the invention.

FIG. 7 is an illustrative example of an actuator that can be used in a physiological setting. Actuator 290 includes positive electrode 292, negative electrode 294, and insulator 296 positioned between the two electrodes. Actuator 290 may be immersed in bodily fluid 298 comprising species 299, which can intercalate into or de-intercalate out of one electrode to a greater extent than the other electrode, for instance, upon application of a voltage or current. This can cause displacement of the actuator from a first orientation to a second orientation. Different modes of displacement of the actuator can be achieved depending on the mechanical design of the actuator. For example, the actuator may be in the shape of a beam, accordion, stent, disc, or a multi-layered stacked structure. Other shapes and designs of actuators can also be used so as to induce expansion, contraction, folding, twisting, bending, rolling, etc. of the structure from a first orientation to a second orientation. In some embodiments, the actuator may be in the form of a medical implant or a component of an implant, such as a stent, sensor, prosthetic, and the like.

In another embodiment of the invention, an actuator system includes at least one electrochemical cell comprising a negative electrode, a positive electrode, and a species that can intercalate, de-intercalate, alloy with, oxidize, reduce, or plate with a first portion of the electrochemical cell to an extent different than a second portion of the electrochemical cell. As a result of one of the interactions above of the species with the first and/or second portion, the first and/or second portions may undergo a dimensional change upon discharge, causing actuator displacement which does mechanical work. In some embodiments, the electrochemical cell is constructed and arranged to be charged in manufacture, and discharged during use. In some embodiments, the electrochemical cell is constructed and arranged to be charged in manufacture, and is partially discharged after use, or, is not further charged after first discharge. The actuator system may be constructed and arranged to spontaneously discharge. In some cases, the actuator may be discharged one or more times at different instances to cause several actuations. Upon discharge (e.g., partial discharge, complete discharge), the actuator may be disposed. Such a configuration may be useful for portable devices such as certain pumps, sensors, implants, and medical devices.

One embodiment of the invention includes an infusion pump for infusing a fluid into a body. The infusion pump includes at least one electrochemical cell comprising a negative electrode, a positive electrode, and a species, wherein the negative and/or positive electrode undergoes a dimensional change upon charge and/or discharge so as to cause infusion of the fluid into the body. Alternatively, the infusion pump may not include a species in manufacture, but upon exposure to a species during use, the infusion pump can perform actuation and infuse a fluid. In some arrangements, the infusion pump is constructed and arranged to spontaneously discharge. Such a device is self-powered, meaning the electrochemical cell of the device is fabricated in the charged state. The device can include positive and negative electrode materials selected such that the electrochemical cell expands or deforms upon discharging. For example, low cost materials such as silicon and tin can be used as expanding materials (e.g., by as much as 300%) upon being lithiated.

The pumping rate, including the magnitude of volume dispensed and the duration of dispensing, can be determined by the cell expansion or deformation rate, which can in turn be controlled through the discharge rate of the electrochemical cell. Control of discharge can be performed by various methods such as by varying the resistance of an external circuit through which the cell discharges. External controls can include, for example, a resistor, including a thin metal or wire that also serves as a fuse. This can be used to permit controlled self-discharge of the electrochemical cell through the resistor or external circuit. In a particular embodiment, a variable-resistor is implemented in the external circuit, including a solid-state circuit, in order to control the discharge rate and pumping rate. By varying the external resistance of the cell, the instantaneous discharge rate and actuation rate can be controlled.

In another embodiment, the duty cycle of the device may be varied in order to control the extent or degree of displacement or pumping. In this embodiment, the external circuit through which the device discharges or charges may be repeatedly switched between open- and close-circuit, or "on and off." That is, the duty cycle may be controlled by opening and/or closing an external circuit associated with the actuator device. The frequency and duration of the on/off pulses can provide control of the rate of displacement and total displacement. For example, if a device under external short-circuit conditions exhibits complete discharge in time t resulting in total strain $\epsilon$, switching between open- and closed-circuit conditions such that the total time spent in closed-circuit is t/10 corresponds to a 10% duty cycle, with the net strain being $\epsilon/10$. In embodiments where the duration of the closed-circuit pulse is constant, the rate of deformation can be controlled by varying the pulse frequency. The pulse frequency and duration can also be independently varied to accommodate inherent nonlinearities in the displacement vs. time response of the device in order to achieve a desired displacement vs. time profile of the actuator or pump.

In other embodiments, the rate of discharge can be designed into the cell (e.g., a self-discharge rate can be engineered). In one particular embodiment, the internal impedance of the cell is designed, using methods known to those skilled in the art of electrochemical devices or batteries, in order to produce a desired rate of discharge. Under external short-circuit conditions, or those conditions where the resistance between the external leads of the cell is substantially lower than the cell internal impedance, the rate of discharge and therefore the rate of actuation is primarily determined by the internal impedance of the cell. For example, the cell may be designed for a certain maximum rate of discharge and lower rates introduced using the control methods described herein, or may be designed to have a relatively high internal impedance providing a safe, low rate of discharge even under accidental short-circuit conditions.

Rate and/or amount of device deformation (and corresponding rate and/or amount of pumping of a pump controlled by such a device) can be built into the device such that, for example, a one-use disposable device pumps at a predetermined, set rate and time and/or volume. Alternatively or in addition, a device can be constructed with a control so that rate and/or extent of discharge/pumping can be varied during use of the device or set among one of several different settings prior to use of the device. In some instances, where a device can be used multiple times, rate and/or amount of discharge/pumping can be varied between uses, during uses, etc. Those of ordinary skill in the art are well able to design, through digital or analog circuitry or a combination, systems in a device for any of these features.

Through these and/or other means, the pumping rate can be varied widely by controlling the discharge rate of the electrochemical cell. In some embodiments, the discharge rate can be remotely controlled, for example, wirelessly through transmission signals sent to a control circuit that controls the duty cycle or resistance of the external load. The pump may dispense different volumes of fluids, for example, greater than 0.01 mL, greater than 0.1 mL, greater than 1 mL, greater than 5 mL, greater than 10 mL, or greater than 50 mL, if desired.

Applications of actuators of the invention in the form of a pump can be used for applications including, but not limited to, subcutaneous delivery of drugs or fluids, intravenous, intrathecal, and other common methods of drugs and fluid delivery to the body, air fresheners or perfume dispensers, and implantable drug delivery devices.

Figure 8A:
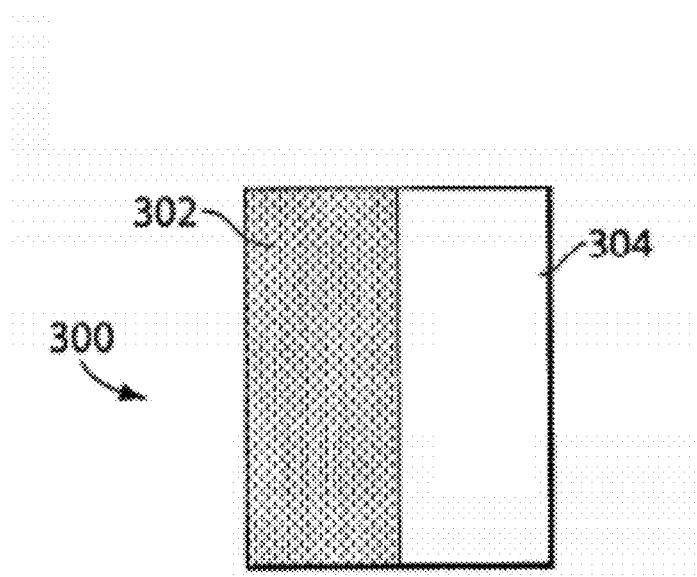
FIG. 8A shows an actuator system comprising first and second portions being formed of different materials.
Figure 8B:
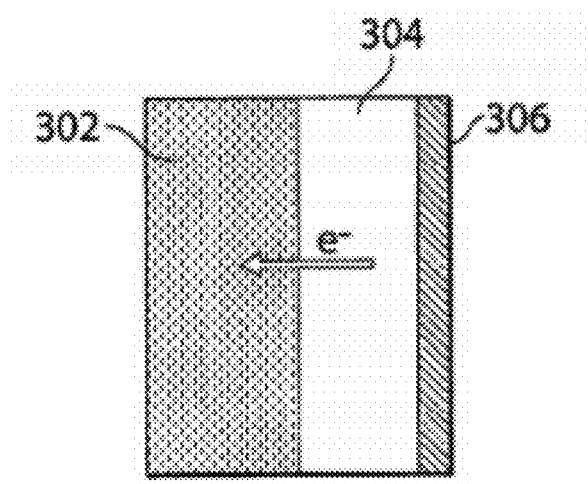
FIG. 8B shows an actuator system comprising first and second portions being formed of different materials, after immersion in water.

For example, it is well-known that when a bimetal couple is immersed in an electrolyte, one of the bimetal pair is the anode and is preferentially not oxidized while the other is preferentially oxidized. An example is the anodic protection of iron and steel with zinc. In an illustrative embodiment, FIG. 8A shows a first portion 302 and a second portion 304, the first and second portions being formed of different materials. FIG. 8B shows the same structure after immersion in water. The structure now includes layer 306. If the first portion comprises Fe, the second portion comprising Zn, upon exposure to water, portion 306 is formed, comprising Zn$(OH)_2$. The reaction at portion 302 is $2H^++2e=H_2(g)$ and the reaction at portion 306 is $Zn+2(OH^-)=Zn(OH)_2+2e$.

Figure 9A:
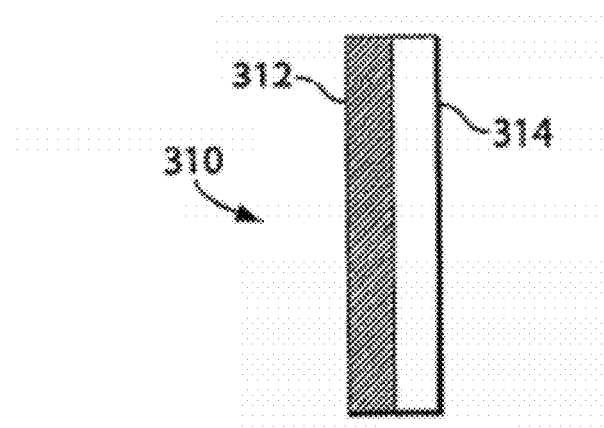
FIG. 9 shows an actuator system comprising a Zn layer (a) in Zn form and (b) upon conversion of Zn to $Zn(OH)_2$, resulting in actuation of the actuator system.
Figure 9B:
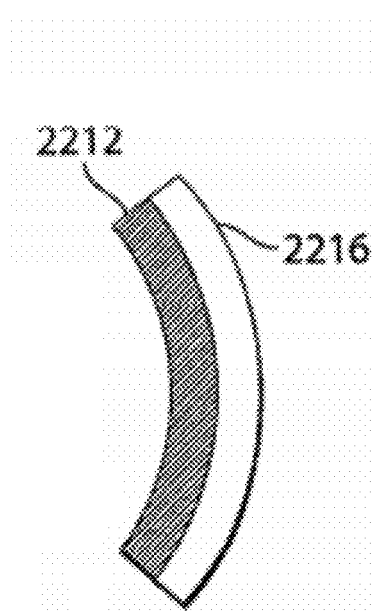

As shown FIGS. 9A-B, actuator 310 includes first portion 312 and second portion 314. If the first portion is formed of Fe and the second portion 314 is formed of Zn in thin layers, upon conversion of Zn to Zn$(OH)_2$, the volumetric expansion during formation of Zn$(OH)_2$ (e.g., $Zn+2(OH^-)=Zn(OH)_2+2e$) would result in spontaneous actuation, causing displacement in the form of bending, as shown in FIG. 9B. This spontaneous actuation can be harnessed in actuators of the invention to perform mechanical work.

Figure 10A:
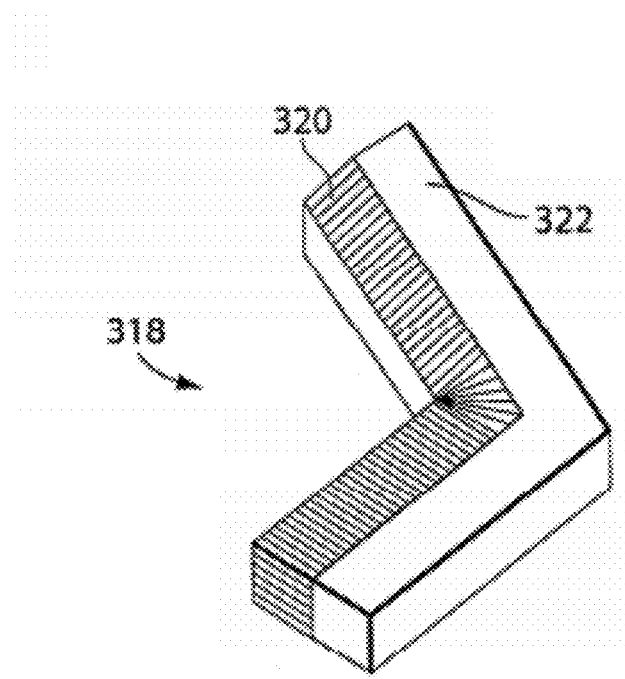
FIG. 10 shows another actuator system comprising a Zn layer (a) in Zn form and (b) upon conversion of Zn to $Zn(OH)_2$, resulting in actuation of the actuator system.
Figure 10B:
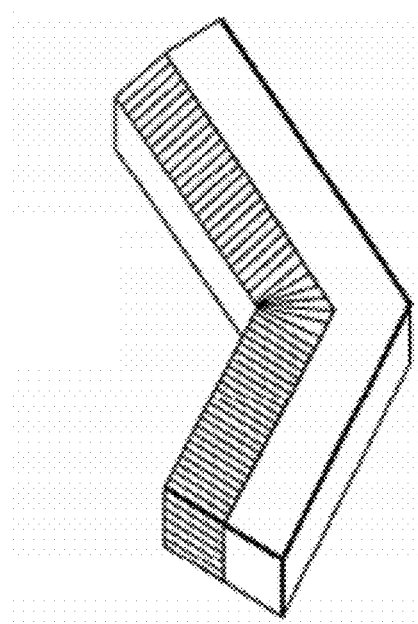

As shown in FIG. 10A-B, if first portion 320 is formed of Zn and the second portion 322 is formed of Fe, upon conversion of Zn (e.g., $Zn+2(OH^-)=Zn(OH)_2+2e$), the structure 318 will open, as shown in FIG. 10B. This type of actuation would be useful for structures such as a stent, an expanding disk to relieve a compressive stress between vertebrate, or other structures. Similar types of actuation can be accomplished using a species that simply swells by preferential absorption of an ion or a molecular species from a fluid.

Those of ordinary skill in art would be able to select other bimetal pairs that would be suitable for use in the invention.

In the body, it is desirable to avoid significant gas evolution. It is also desirable to have ductile yet strong materials that undergo permanent plastic deformation, for certain applications. In some embodiments, it may be advantageous to use an actuator that spontaneously discharges when a positive and negative material are electrically shorted to each other and immersed in an electrolyte containing a species that can intercalate, de-intercalate, alloy with, oxidize, reduce, or plate with at least a portion of the actuator.

Figure 11A:
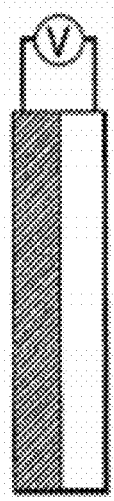
FIG. 11 shows an actuator system comprising a lithium ion couple, wherein the actuator (a) is at zero strain before exposure to an electrolyte and (b) undergoes actuation after exposure to the electrolyte.
Figure 11B:
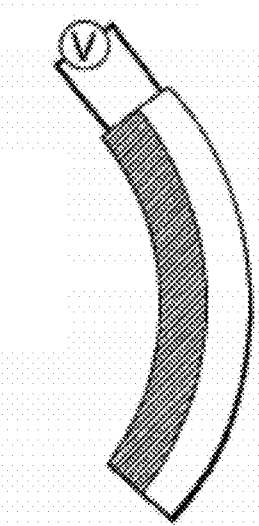

FIGS. 11A-B show a lithium ion couple (e.g., one portion comprising $Li_{0.5}CoO_2$ and another portion comprising $Li_xTi_5O_{12}$, where x>4) assembled in the charge state and which undergoes spontaneous discharge upon emergence in an electrolyte. (Alternatively to a lithium ion couple, the actuator may be a nickel metal-hydride couple (e.g., one portion comprising $Ni^{3+}OOH$ and the other portion comprising $MH_x$ where M is a metal), assembled in the charge state and which undergoes spontaneous discharge upon emergence in an electrolyte.) FIG. 11A shows the actuator at zero strain before exposure to an electrolyte and FIG. 11B shows the actuator after exposure to the electrolyte. Upon discharge, a first portion of the actuator expands to a larger volume than a second portion of the actuator, thereby causing bending (contraction) of the actuator. Thus, the spontaneous discharge upon exposure of the actuator to an electrolyte can cause actuation.

Figure 12A:
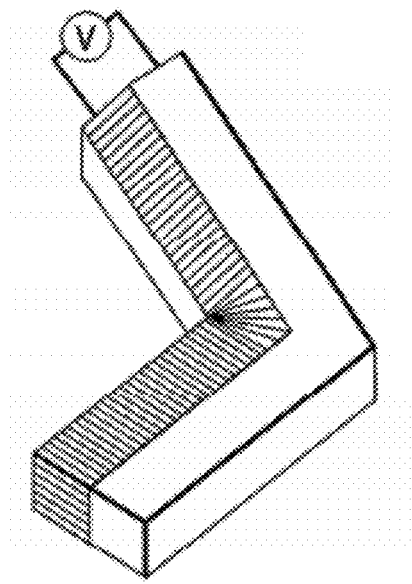
FIG. 12 shows a lithium ion couple or a nickel metal-hydride couple assembled in (a) the charge state and (b) upon spontaneous discharge after emergence in an electrolyte.
Figure 12B:
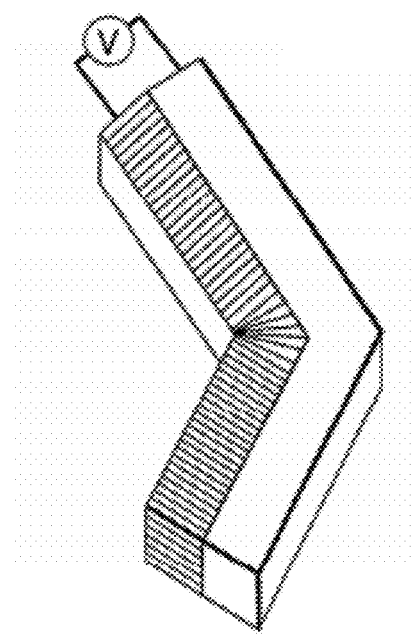

FIGS. 12A-B show a lithium ion couple or a nickel metal-hydride couple assembled in the charge state (FIG. 12A) and which undergoes spontaneous discharge (FIG. 12B) upon emergence in an electrolyte. The shape of the actuator causes it to expand upon spontaneous discharge.

Figure 13A:
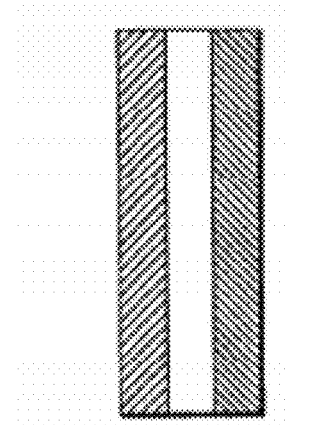
FIG. 13 shows an actuator system comprising two different portions (a) prior to exposure to an electrolyte and (b) upon exposure to an electrolyte, wherein the system undergoes bending or cupping.
Figure 13B:
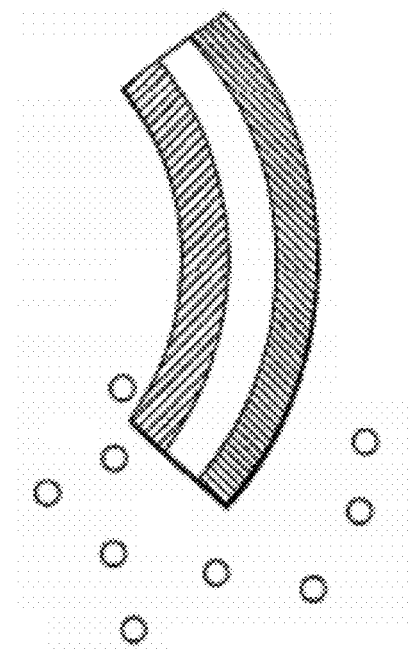
Figure 14A:
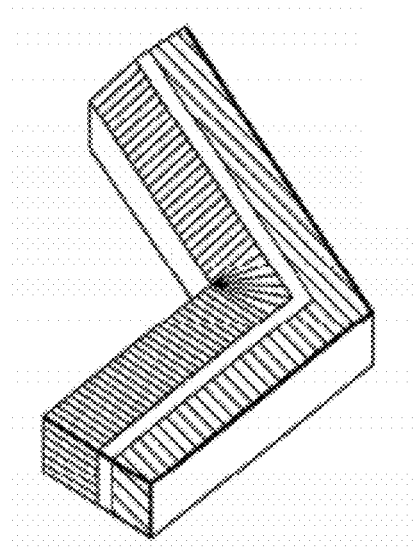
FIG. 14 shows an actuator system comprising two different portions (a) prior to exposure to an electrolyte and (b) upon exposure to an electrolyte, wherein the system undergoes bending or opening of the structure.
Figure 14B:
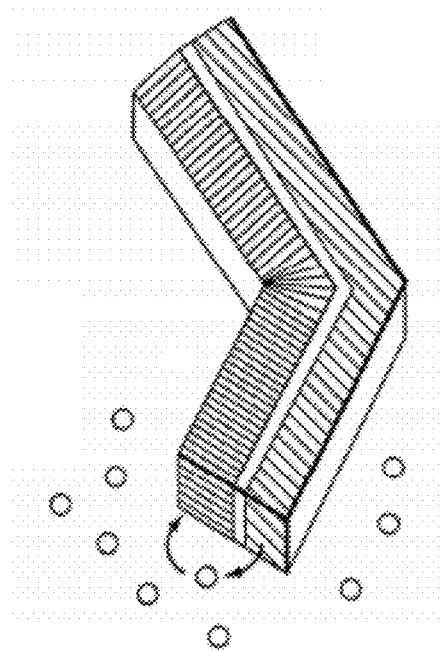

Several types of materials can be used in actuators of the invention. For example, titanium metal may be used as an electrode material when the species is hydrogen, since titanium metal is a very good hydrogen absorption medium. Other suitable hydrogen absorption media include noble metals. Pt, Rh, Ir and Au are also ductile and strong metals that can be used as electrode materials. In one particular embodiment, a spontaneously-opening stent (or other actuator design) can be fabricated by joining, for example, a hydrated metal to a non-hydrated metal such that upon exposure to an electrolyte, the transfer of hydrogen from one to the other causes displacement of the actuator. This specific approach can also benefit from the introduction of a diffusion barrier between the two metals, as is widely used in semiconductor device technology, to avoid diffusion of hydrogen between the two metals causing actuation before exposure to the electrolyte, as shown in FIGS. 13-14. FIG. 13 shows an actuator system comprising two different portions, each comprising a different material (e.g., metal), and optionally a diffusion barrier positioned between each portion, (a) prior to exposure to an electrolyte and (b) upon exposure to an electrolyte, wherein the system undergoes bending or cupping. Similarly, FIG. 14 shows an actuator system comprising two different portions, each comprising a different material (e.g., metal), and optionally a diffusion barrier positioned between each portion, (a) prior to exposure to an electrolyte and (b) upon exposure to an electrolyte, wherein the system undergoes bending or opening of the structure. In some embodiments, iridium is attractive as a metal used to form at least a portion of the actuator due to its biocompatibility.

Figure 15A:
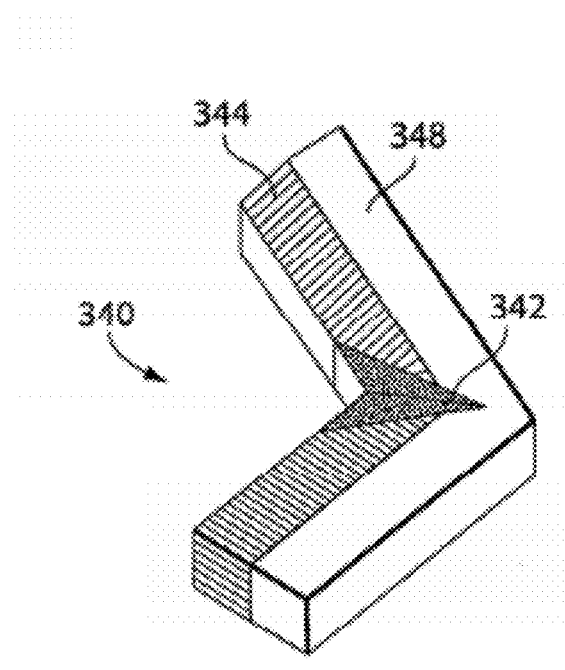
FIG. 15 shows an actuator system having a hinged structure (a) prior to exposure to a species and (b) upon exposure to a species, wherein the system undergoes actuation.
Figure 15B:
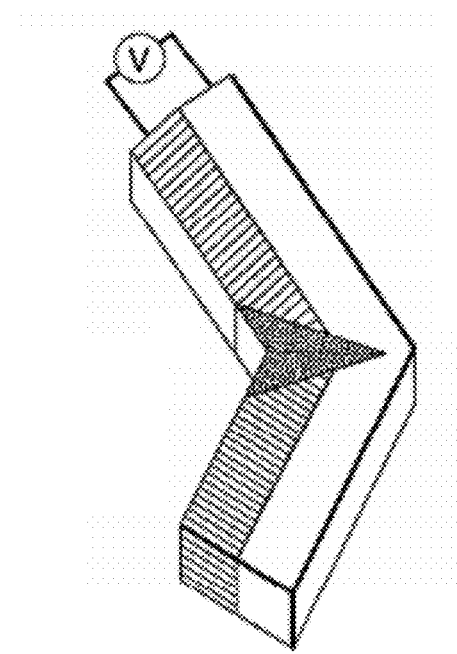

In another embodiment, actuators of the invention can include hinged structures, e.g., as shown in FIGS. 15A-B. The actuator may include first portion 342 that can preferentially intercalate, de-intercalate, alloy with, oxidize, reduce, or plate a species, and second portion 344 that does not preferentially intercalate, de-intercalate, alloy with, oxidize, reduce, or plate the species. In some instances, second portion 346 and third portion 348 are formed of the same material. Upon exposure of the actuator to a first species, the first portion can intercalate, de-intercalate, alloy with, oxidize, reduce, or plate a species to a different extent than that of the first and/or third portion, causing displacement (e.g., expansion) of the actuator, as shown in FIG. 15B. Optionally, second portion 346 and third portion 348 are formed of different materials, and upon exposure to a second species, the actuator may be displaced from a first orientation to a second orientation.

Actuators of the invention including a first portion and a second portion, which upon charge and/or discharge, a species is intercalated, de-intercalated, alloys with, oxidizes, reduces, or plates with the first portion to an extent different than the second portion, the first portion experiencing a resulting dimensional change relative to the second portion, can be used in a variety of settings. Accordingly, actuators of the invention can have configurations, shapes, and/or designs, other than those described above. Examples of such configurations shapes, and/or designs include those described in U.S. Pat. Nos. 6,545,384; 5,907,211; 5,954,079; 5,866,971; 5,671,905; and 5,747,915, which are each incorporated herein by reference.

Considerations for the design of low voltage, long-life electrochemical actuators are now described. In some embodiments, the design of a low voltage, long-life electrochemical actuator includes certain operating criteria. In one embodiment, a method of operating an electrochemical cell comprising a negative electrode, a positive electrode, a non-aqueous electrolyte, and lithium as a species (e.g., an intercalation species) is provided. The electrochemical cell can be operated such that the positive electrode has an average equilibrium potential (or open-circuit voltage (OCV)) with respect to metallic lithium over the state of charge of its use that is less than about +4V. The negative electrode can have an average potential with respect to metallic lithium over the state of charge of its use that is greater than about +0.2V. The electrochemical cell may be in operative relationship with a component that can be displaced from a first orientation to a second orientation. Operation of the electrochemical cell can cause a volumetric or dimensional change of the electrochemical cell. Upon application of a voltage of less than about 10V to the electrochemical cell, the component can be displaced from the first orientation to the second orientation from the volumetric or dimensional change of the electrochemical cell.

As described in more detail below, too high of a potential at the positive electrode can result in electrochemical corrosion of the current collector and/or active materials at the positive electrode. In some cases, the high potential can also cause degradation of nonaqueous electrolytes or salts, which can result in loss of electrolyte conductivity and/or undesirable side effects within the cell. As such, certain electrochemical cells of the invention can be operated to have an average equilibrium potential over the state-of-charge of the cell of less than about +4V, less than about +3.5V, less than about +3.0V or less than about +2.5V.

Also described below, too low of an average equilibrium potential (e.g., with respect to metallic lithium over the state of charge of its use) can cause negative affects such as electrochemical corrosion of the negative electrode current collector or the deposition of lithium metal. Accordingly, electrochemical cells may be operated such that the negative electrode has an average equilibrium potential of greater than about +0.2V, greater than about +0.5V, greater than about +1.0V, or greater than about +1.5V. Depending on the particular electrochemical cell, a maximum and a minimum range of average equilibrium potential of the positive and negative electrodes, respectively, can be chosen. For instance, in one embodiment, the positive electrode has an average equilibrium potential of less than about +3.5V and the negative electrode has an average equilibrium potential of greater than about +0.5V. In another embodiment, the positive electrode has an average equilibrium potential of less than about +3.5V and the negative electrode has an average equilibrium potential of greater than about +1.0V. In yet another embodiment, the positive electrode has an average equilibrium potential of less than about +3.5V and the negative electrode has an average equilibrium potential of greater than about +1.5V. In yet another embodiment, the positive electrode has an average equilibrium potential of less than about +3.0V and the negative electrode has an average equilibrium potential of greater than about +0.5V. Of course, other ranges of average equilibrium potential for the positive and negative electrodes can be chosen.

In certain embodiments, operating an electrochemical cell can involve applying a voltage of less than about 10V to the electrochemical cell and, from the volumetric or dimensional change of the electrochemical cell, displacing the component from a first orientation to a second orientation. As discussed in more detail below, the applied voltage (i.e., the operating voltage) is generally low so as to increase the cycle life of the electrochemical actuator. Accordingly, operating an electrochemical cell may include applying a voltage of less than about 10V, less than about 8V, less than about 7.5V, less than about 6V, less than about 5V, or less than about 4V. It should be understood, however, that for certain periods requiring high power actuation over short time durations, applied voltages may be higher than the steady-state voltage applied. Accordingly, greater than 95% of the operating life of an electrochemical cell may be operated with an applied voltage of less than about 10V, less than about 8V, less than about 7.5V, less than about 6V, less than about 5V, or less than about 4V. In other instances, greater than 90%, greater than 80%, greater than 70%, greater than 60%, or greater than 50% of the operating life of the electrochemical cell may be operated at such voltages.

The following considerations for the design of low voltage, long-life electrochemical actuators are described specifically for the design of nonaqueous electrolyte lithium electrochemical cells. However, is should be understood that the principals can also be applied to any electrochemical cell used as an actuator.

The driving force for transport of a species, including an ionic species, in an electrochemical cell used as an actuator can be the overpotential (during charging) or underpotential (during discharging), the overpotential and underpotential being, respectively, the magnitude of the applied voltage over and under the equilibrium or rest or open-circuit voltage (OCV) of the cell at a particular state of charge. The OCV as a function of state of charge can be readily determined by those of ordinary skill in the art if the potential vs. x (concentration) of each compound is known, and if cell parameters such as the ratio of cathode to anode material and the degree of irreversible loss of the ionic species during cycling are known. For example, $LiCoO_2$-graphite cells can have an OCV that varies continuously with state of charge between about 3.9V and about 3V, while $LiFePO_4$-graphite cells have a nearly constant voltage of about 3.3V over a wide state of charge.

For high rate of actuation, it may be desirable to have a large overpotential during charge and large underpotential during discharge. On the other hand, it is also recognized herein that the range of potentials applied to an electrochemical cell can influence the performance and life of the cell, especially over many charge/discharge cycles, for several reasons. At the high end of the operating voltage range, it is recognized that too high a potential can cause electrochemical corrosion of the current collector (such as aluminum) or active materials at the positive electrode, or degradation of nonaqeuous electrolytes or salts. This can result in loss of electrolyte conductivity or undesirable side effects such as formation of gas within the cell. At the low end of the operating voltage, too low a potential can cause electrochemical corrosion of the negative electrode current collector (such as copper) or the deposition of lithium metal, the latter occurring if the potential at the negative electrode reaches that at which metallic lithium is stable. Thus, for high rate of actuation, as well as for stability and long life in a nonaqueous lithium electrochemical cell used for actuation, it may be desirable to have a relatively low OCV such that a high overpotential can be applied during charge without reaching stability limits of the electrolyte system or positive current collector. However, the low OCV should not be too low; otherwise, a high underpotential applied during discharge may reach potentials at which anode current collectors (such as copper) dissolve, or this may cause metallic lithium may be plated. The selection of active materials for the positive and negative electrodes meeting these criteria is important, as it may be desirable to provide high actuation energy and power in electrochemical cells of the invention.

In some embodiments, it is desirable to have a positive electrode material with both high rate and high strain, and an OCV measured with respect to metallic lithium that is less than about 4V. In other embodiments, the OCV measured with respect to lithium is less than about 3.5V, less than about 3V, or less than about 2.5V. Non-limiting examples of such positive electrode materials include electrode compounds based on $LiFePO_4$, $TiS_2$, $TaS_2$, and their alloys and compositionally modified forms. In some cases, electrochemical cells include negative electrode materials with high power as well as an OCV over the range of composition used that is at least +0.1V with respect to metallic lithium. In other cases, the OCV is at least +0.5V or more. For example, graphite can be a suitable material when used with a positive electrode material such that the net strain is substantial. Another suitable material includes $Li_xTiO_2$ spinel, e.g., the starting composition $Li_4Ti_5O_{12}$, which upon lithiation has a nearly constant potential of about 1.57V with respect to metallic lithium over a wide range of lithium compositions and nearly zero volume change. Accordingly, this can allow the volume change at the positive electrode to be used for actuation. In some embodiments, electrochemical cells based on such combinations of positive and negative electrode materials have cell OCVs typically less than about 3.5V. Of course, it is possible to have a cell voltage that varies between positive and negative values as the cell is charged or discharged, while maintaining throughout the above described conditions of a positive electrode potential that is not too high and a negative electrode potential that is not too low with respect to metallic lithium.

When such a cell is used for electrochemical actuation, the overpotential and underpotential applied can result in a charging voltage that is above, and a discharging voltage that is below, the cell OCV. However, generally, the absolute value of the operating voltage of the cell remains low. For example, the absolute value of the operating voltage may be less than about 10V, less than 7.5V, less than 5V, or less than about 3.5V. It should be noted that for high power actuation over short time duration, the applied voltages can be of a pulsed nature and can safely be significantly higher than the steady-state voltage that would normally result in electrochemical damage to such cells. However, for operation of electrochemical cells under conditions where the cell's voltage is maintained, to obtain long life, the applied voltage may result in a potential at the positive electrode that is less than about 5V, less than about 4.5V, or less than 4V, with respect to metallic lithium. This can be permitted by the use of positive electrode materials based on compounds such as $LiFePO_4$, $LiTiS_2$, and $LiTaS_2$.

Selection criteria for high mechanical energy density, high power electrochemical actuation compounds are now described. The theoretical mechanical energy density of actuation compounds is given by the equation $\frac{1}{2}E\epsilon^2$, where E is the elastic modulus and $\epsilon$ is the strain that can be induced under particular operating conditions. Thus, materials of high strain and high elastic modulus have the potential for providing higher energy density in electrochemical cells of the invention.

With respect to electrochemical actuators, it is recognized herein that the strain obtained is not necessarily linear with the concentration of intercalating or alloying species in the electrochemical cell. For example, in a graph of the strain vs. Li concentration x of the intercalation compound $LiTiS_2$, the slope of the curve is steepest at low Li concentrations, as described in U.S. patent application Ser. No. 11,796,138, incorporated herein by reference. Accordingly, it is desirable when using $Li_xTiS_2$ as an electrochemical actuation compound, to operate over a range of x of about 0 to 0.4 if it is desirable to obtain the most mechanical energy for a given electrical energy used to operate the actuator, and/or to obtain the highest mechanical power from the actuator. The latter follows from the consideration that the amount of intercalated species x is the product of the electrical current and time, so that for a particular operating current, faster actuation is obtained for compounds with a higher strain for a given value of x.

It is also recognized that the mechanical power of electrochemical actuators may depend on the rate capability (e.g., rate of charge or discharge) of the electrochemical cell. High rate capability may be obtained by selecting electrolytes of high ionic conductivity and/or designing cells so that the ion or electron diffusion lengths are short. For a particle-based electrode, for example, a fine particle size may be desirable in order to decrease the diffusion length, and accordingly, the diffusion time.

The transport properties of materials can be, therefore, also an important selection criterion for designing electrochemical actuators. For example, the chemical diffusion coefficient of the ionic species responsible for the volume change may be selected to be high. One embodiment of the invention identifies a "power factor" that can be used as a figure of merit for comparing different materials, given by the equation $\frac{1}{2}E\epsilon^2 D$, where D is the chemical diffusion coefficient of the ionic species in the material of interest. FIG. 4 compares the power factor of different materials against their specific gravity. It is noted that materials of high power factor and low specific gravity $\rho$ can, all else being equal, provide higher specific power as an electrochemical actuator. For example, layered dichalcogenides such as $TiS_2$ and $TaS_2$ may be particularly useful electrochemical actuation compounds according to these criteria.

The inventors have recognized that figures of merit of interest in the field of actuation also include power density, which is the mechanical power available per unit volume, and specific power, which is the mechanical power available per unit mass. It is desirable to maximize the values of both in most actuation applications. It should be noted that the power density of electrochemical actuators requires consideration of the characteristic diffusion length that the ionic species are transported over during operation of the electrochemical actuator. While the transport length includes the length between electrodes, through the porosity of the electrode, and across the separator, the rate of actuation does not exceed the time necessary for diffusional transport into the material itself. Thus, both the particle size (for a particle-based actuator) and the chemical diffusion coefficient are important factors. To compare materials on a equal basis, assuming that materials can be processed to have similar particle sizes, the power density can be defined as the quantity $\frac{1}{2}(E\epsilon^2 D_{Li}/x^2)$, and the specific power as $\frac{1}{2}(E\epsilon^2 x^2 \rho/D_{Li})$, where x is the particle dimension (e.g., radius or diameter). FIG. 4 compares the power density of different materials against their specific gravity, and FIG. 6 compares the power density against the specific power of different materials. From these selection criterion, suitable materials for electrochemical actuators can be chosen. For example, layered dichalcogenides such as $TiS_2$ and $TaS_2$ can be particularly useful electrochemical actuation compounds.

In one embodiment, electrochemical actuators of the invention utilize at least two (e.g., a first and a second) electrochemical actuators working in concert such that as one is charged (e.g., in order to produce useful mechanical work), the other is discharged, or vice versa. For example, a system or device may comprise a first and a second electrochemical cell configured in an antagonistic arrangement relative to one another, such that discharge of the first cell results in charging of the second cell, and discharge of the second cell results in charging of the first cell. The article may also include a component constructed and arranged to be displaced from a first orientation to a second orientation by charge and/or discharge of at least one of the first and second electrochemical cells. Of course, a structure including electrochemical cells that are configured in an antagonistic arrangement relative to one another can include a plurality of such sets of electrochemical cells, e.g., greater than 2, greater than 5, greater than 10, greater than 20 or greater than 50 pairs of electrochemical cells that are configured in an antagonistic arrangement. Such cells can be operated in series or in parallel relative to one another. Although pairs of opposed actuators have been used in active structures previously (for the reason that most actuators work better in tension than in compression or vice versa), there are additional benefits of such designs for use in the electrochemical actuators of the invention. Electrochemical actuators store or release electrical energy at the same time that they are performing mechanical work, and if such electrical energy is dissipated (e.g., in the form of heat by dissipating the electrical energy through a resistor), the energy consumption of the actuator or system of actuators can be high. However, by shuttling electrical energy between actuators so that as one is charged the other is discharged, electrical energy is largely conserved. Another benefit of antagonistic electrochemical actuators, positioned so that each can exert a force on the other, is that the stress placed on the actuators can be controlled by charging or discharging one or both of the opposed actuators. For example, this arrangement can allow the prestress on the actuators to be controlled to optimize actuation force, creep, and/or the compliance of the actuator. Yet another benefit is that the positioning accuracy of the actuator is improved when opposing actuators can be independently charged or discharged.

Typical electrochemical cells include an electrode (e.g., an anode) that expands while the other (e.g., the cathode) contracts during charge, or vice-versa during discharge, in other to reduce the amount of volume change in the cell. This can be advantageous for certain applications since low volume change can, for example, reduce delamination of certain layers within the cell. However, in some embodiments of the invention, it is advantageous for both electrodes to expand during charge or discharge, or for one electrode to not contract while the other expands. Advantageously, such configurations allow maximum energy to be used for actuation, instead of being wasted in counteracting the other electrode.

Accordingly, another embodiment includes an electrochemical cell comprising an anode and a cathode that are constructed and arranged such that during a cycle in which one of the electrodes expands at least 1% by volume, the other electrode does not substantially contract. In other embodiments, one of the electrodes expands at least 0.5% by volume, at least 2% by volume, or at least 4% by volume, while the other electrode does not substantially contract. For instance, as one of the anode or cathode expands, the other can either expand, or may not change in volume. A component can be in operative relationship with such an electrochemical cell, and the component can be displaced from a first orientation to a second orientation by charge and/or discharge of the electrochemical cell. This simultaneous expansion of the anode and cathode, or the expansion of one electrode while the other electrode does not contract, can be performed by using appropriate materials for the anode and cathode.

In some cases, an electrode may spontaneously discharge a species (e.g., lithium), causing either an expansion or contraction of the electrode and/or movement of one or more components of the device from a first orientation to a second orientation. Electrode materials which exhibit spontaneous discharge are known in the art and may be advantageous in cases where a particular "default" state of the device is desired, for example, in the event of an intentional or accidental short circuit of the electrochemical cell.

Materials suitable for use as electrodes include electroactive materials, such as metals, metal oxides, metal sulfides, metal nitrides, metal alloys, intermetallic compounds, other metal-containing compounds, other inorganic materials (e.g., carbon), and the like. In some cases, the electrodes may advantageously comprise materials having a high elastic modulus. In some cases, the material may be capable of undergoing a change in volume or other dimensions upon interaction with a species, as described herein. In some embodiments, the electrodes may comprise a material comprising a crystal structure, such as a single crystal or a polycrystal. In some embodiments, the electrodes may comprise an amorphous or disordered material.

In some cases, the material forming the anode comprises one or more of aluminum, silver, gold, boron, bismuth, gallium, germanium, indium, lead, antimony, silicon, tin. In some embodiments, the material forming the anode may comprise $Li_4Ti_5O_{12}$ or any alloy or doped composition thereof. Examples of materials that can form the cathode include $LiCoO_2$, $LiFePO_4$, $LiNiO_2$, $LiMnO_2$, $LiMn_2O_4$, $Li_4Ti_5O_{12}$, $TiSi_2$, $MoSi_2$, $WSi_2$, $TiS_2$, or $TaS_2$, or any alloy or doped composition thereof. In some cases, the material forming the cathode may comprise $TiS_2$ or $TaS_2$. In others embodiments, the material forming the cathode can comprise $LiMPO_4$, where M is one or more first-row transition metals (e.g., Sc, Ti, V, Cr, Mn, Fe, Co, Ni, Cu, or Zn), or any alloy or doped composition thereof. In some cases, the cathode comprises carbon, wherein the carbon may be in the form of graphite, a carbon fiber structure, a glassy carbon structure, a highly oriented pyrolytic graphite, a disordered carbon structure, or a combination thereof. An electrochemical cell comprising such material compositions may be operated at a cathode potential described above, e.g., less than +4V with respect to the potential of metallic lithium. The anode potential may be selected from the potentials described above, e.g., greater than +0.5V with respect to the potential of metallic lithium.

In some cases, the material forming the electrode may comprise species dispersed within the material. For example, the electrodes may comprise an amount of a species such that the electrode can serve as a source of the species within the device. In some embodiments, a substrate or other supporting material may interact with a species to induce a volumetric or dimensional change. For example, a silicon wafer, or other metal or metal-containing substrate may be lithiated such that a volumetric or dimensional change occurs upon charge/discharge of the electrochemical cell.

The materials for use in electrodes of the invention may be selected to exhibit certain properties upon interaction with a species (e.g., lithiation and de-lithiation). For example, the materials may be selected to exhibited a certain type or amount of volumetric or dimensional change (e.g., actuation) when used in an electrochemical cell as described herein. Those of those of ordinary skill would be able to select such materials using simple screening tests. In some cases, the properties and/or behavior of a material may be known, and one of ordinary skill in the art would be able to select materials to suit a particular application based on, for example, the amount of volumetric change desired. For example, reversible lithium intercalation with phospho-olivines $Li(Fe,Mn)PO_4$ is known to produce volume changes of 7.4-10%, based on the ratio of Fe/Mn, as described in A. Yamada et al., J. Electrochem. Soc., 148, A224 (2001). In some cases, materials may be screened by incorporating a material as an electrode within an electrochemical cell and observing the behavior of the material upon charge and discharge of the cell.

In some cases, the electrode materials may be selected based on the ability of a material to interact with the species. For example, where lithium is the species, a material may be selected based on its ability to rapidly and/or reversibly accept lithium ions (e.g., be lithiated) and/or donate lithium ions (e.g., be de-lithiated) upon charging/discharging. Also, the corresponding strain associated with reversible interaction of the species with the material may be determined by knowing the rate of ion transport into the material. Such determinations may be tested experimentally or made theoretically using tabulated or estimated values of properties such as ion diffusion coefficients, ionic and electronic conductivities, and surface reaction rate coefficients. Those of ordinary skill in the art would be able to use this information to select appropriate materials for use as electrodes.

Electrodes may be fabricated by methods known in the art. In one embodiment, the electrode materials may be cast from powder-based suspensions containing a polymer binder and/or a conductive additive such as carbon. The suspension may be calendered (e.g., rolled) under high pressure (e.g., several tons per linear inch) to form densely compacted layers having a desired volume percentage of active material.

Materials suitable for use as an electrolyte include materials capable of functioning as a medium for the storage and transport of ions, and in some cases, as a separator between the anode and the cathode. Any liquid, solid, or gel material capable of storing and transporting ions may be used, so long as the material is electrochemically and chemically unreactive with respect to the anode and the cathode, and the material facilitates the transport of ions (e.g., lithium ions) between the anode and the cathode. The electrolyte may be electronically non-conductive to prevent short circuiting between the anode and the cathode.

The electrolyte can comprise one or more ionic electrolyte salts to provide ionic conductivity and one or more liquid electrolyte solvents, gel polymer materials, or polymer materials. In some cases, the electrolyte may be a non-aqueous electrolyte. Suitable non-aqueous electrolytes may include organic electrolytes including liquid electrolytes, gel electrolytes, and solid electrolytes. Examples of non-aqueous electrolytes are described by, for example, Dorniney in Lithium Batteries, New Materials, Developments and Perspectives, Chapter 4, pp. 137-165, Elsevier, Amsterdam (1994), and Alamgir et al. in Lithium Batteries, New Materials, Developments and Perspectives, Chapter 3, pp. 93-136, Elsevier, Amsterdam (1994). Examples of non-aqueous liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted derivatives thereof (e.g., halogenated derivatives thereof), and combinations thereof.

In some embodiments, electrochemical cells may further comprise a barrier or separator material (e.g., layer) positioned within the system or device, for example, between the cathode and anode. The separator may be a material which separates or insulates the anode and the cathode from each other preventing short circuiting, and which permits the transport of ions between the anode and the cathode. Materials suitable for use as separator materials include materials having a high elastic modulus and/or high stiffness (e.g., rigidity), materials which are electronically insulating, and/or materials having sufficient mechanical strength to withstand high pressure, weight, and/or strain (e.g., load) without loss of function. In some cases, the separator layer may be porous. Examples of separator materials include glass, ceramics, a silicate ceramic, cordierite, aluminum oxide, aluminosilicates, or other mixed-metal oxides or nitrides or carbides that are electronically insulating. In some cases, the separator layer may comprise a polymeric material. Separator layers comprising, for example, elastomeric materials, may be useful in allowing shearing motions between one or more components.

In one embodiment, the porous separator material may be cast as a particulate or slurry layer on the surfaces of one or both electrodes prior to assembly of the layers, using methods known to those of ordinary skill in the art of ceramic processing or coating technology, such as spray deposition, doctor blade coating, screen printing, web coating, comma-reverse coating, or slot-die coating.

Devices of the invention may further comprise additional components to suit a particular application. For example, devices of the invention may comprise a power supply, current collector, such as a current collector comprising a conductive material, external packaging layers, separator layers, and the like. The packaging layer may comprise an electrochemically insulating material or other protective material.

The system or devices may be optionally pretreated or processed prior to use as a an actuator. Pretreatment of the devices may enhance the mechanical performance, stiffness, actuation energy density, actuation strain, reversibility, and/or lifetime of the devices, and/or may reduce creep deformation and hysteresis of strain. In some cases, the devices, or one or more components thereof, may be subjected to hydrostatic pressure and/or uniaxial stress to consolidate the materials and/or components of the device, and/or reduce the amount of free volume. In some embodiments, the applied pressure may be 10,000 psi, 20,000 psi, 30,000 psi, 45,000 psi, or greater. It should be understood that any amount of applied pressure may be used to pretreat a device, such that internal failure of the device is prevented and/or improvement of device performance may be achieved.

The following examples are intended to illustrate certain embodiments of the present invention, but are not to be construed as limiting and do not exemplify the full scope of the invention.

EXAMPLE 1

Self-powered Electrochemical Pump

In this prophetic example, actuators of the invention can be used as self-powered electrochemical pumps for insulin therapy.

Clinical treatment of type 1 diabetics is usually insulin therapy, where injections of long and short acting insulin are used in combination to respond to periodic blood glucose measurements. Treatment may include insulin infusion pump therapy, including continuous subcutaneous insulin infusion (CSII), which dispenses rapid acting insulin from a microprocessor controlled pump through a minute catheter. Some existing pumps can continuously dispense rapid acting insulin and may provide incremental doses before or after meals. The infusion set is changed every three days so the effective number of injections is dramatically reduced over the conventional multiple daily injection (MDI) regimen. The exclusive use of rapid acting insulin yields a much improved predictability in dosing as the long acting forms of insulin work by forming a depot under the skin. However, insulin release rate from such depots can vary significantly depending on factors such as physical activity. Self-powered electrochemical pumps can address the problems of reduced effective number of injections and varying insulin release rates.

Figure 16:
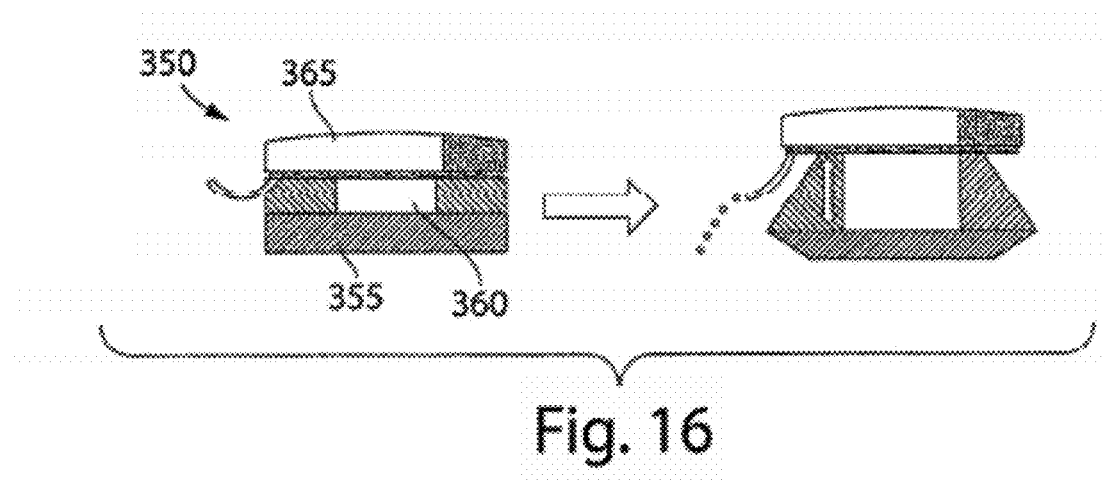
FIG. 16 shows a schematic design for a self-powered electrochemical pump.

A self-powered electrochemical pump may be designed to deliver 2.0 mL payload over a 72 hour period. FIG. 16 shows a schematic design for the self-powered electrochemical pump 350. The negative electrode 355 provides a source of lithium, while the positive electrode 360 is the expanding element. The cell is electrochemically balanced so that the available lithium in the negative electrode can expand the positive electrode. The pump can be designed for a 300% volume expansion of the positive electrode, creating a longitudinal displacement, not unlike a piston, that delivers force to an actuation plate which in turn applies pressure to a reservoir 365 containing the insulin solution. The vertical displacement of the positive electrode can be determined by its width/height aspect ratio (here assumed to be 2:1) and volume change. The electrolyte may be a standard non-aqueous lithium battery electrolyte. The packaging can be a polymer packaging similar to that currently used for rechargeable lithium ion batteries.

Advantageously, the release rate of the insulin solution can be controlled by choosing appropriate materials used to form the positive electrode. For example, for an electrochemical pump having a positive electrode material of relatively low stiffness, the positive electrode can slowly displace to its new equilibrium position upon discharge. This can result in a slow application of a force to the reservoir, thereby causing slow infusion of insulin to the body.

The pump may have a volume of 8.6 mL, which will allow a total device volume of <15 mL. The pump mass of 14.5 g should allow a total device mass of about 20 g. With the appropriate choice of materials and electrolyte, this pump design can deliver insulin over 72 h at the basal rate required. For the bolus rate, which corresponds to a cell discharge rate of approximately C/5 (i.e., 5 hr discharge for the entire capacity of the cell), additional design modifications can be incorporated. Additionally and/or alternatively, the pump may have similar specifications as those for existing continuous infusion pumps. For example, rapid acting insulin such as the Lilly product Lispro® comes packaged as solutions with 100 units per mL concentration. Typical basal insulin levels might be adjusted between 0.5 to 1.5 units per hour. A bolus dose for a meal might consist of 1 unit per 10 gm of carbohydrate consumed, so as much as 10 units for a meal may be desired. The pharmacodynamics of the rapid acting insulin suggests that the dose be delivered over 15 minutes. Any longer and one might see some differences from a subcutaneous injection of the same amount. Thus, the peak rate of delivery is a volume of 0.1 mL in 15 minutes. A linear compression of a reservoir with 6.5 $cm^2$ cross section requires 0.015 cm in 15 minutes or 0.167 microns per second maximum displacement rate. The total daily payload of insulin solution must be approximately 50 units or 0.5 mL. Thus, a three day supply requires 1.5 mL volume payload.

EXAMPLE 2

Electrochemical Actuator

In this prophetic example, an electrochemical actuator comprises a bimorph structure including a layer of dimensionally-active lithium storage material bonded to a layer of copper. The layer of copper does not alloy or intercalate substantially with lithium, yet is electrochemically stable at the operating potentials of the electrochemical cell. This bimorph structure forms the positive electrode of the cell. The copper layer can also act as a positive electrode current collector, and may extend outside the final sealed cell to form a tab or current lead, or may be joined to a tab or current lead that extends outside the cell. The negative electrode is a layer of lithium metal bonded to or deposited on a copper layer serving as the negative current collector. Between the two electrodes is positioned a porous separator film, e.g., a glass fiber cloth or a porous polymer separator such as those used in the construction of lithium ion batteries. The layered cell is infused with a nonaqueous lithium-conducting liquid electrolyte such as is commonly used in lithium primary or rechargeable battery technology, or nonaqueous electrical double layer capacitors. Examples include a solvent comprising a 1:1 by volume mixture of ethylene carbonate and diethylene carbonate, to which has been added a 1M concentration of $LiPF_6$ as a lithium conducting salt, or acetonitrile as a solvent to which has been added the same $LiPF_6$ salt.

The electrochemical actuator is sealed in a polymer packaging. Upon assembly, the cell is in a charged state, with the tin positive electrode having a lower chemical potential for lithium than the lithium metal negative electrode. Upon connecting the negative and positive current collectors so that electronic current flows between the two electrodes, a lithium ion current flows internally from the lithium to the tin. The alloying of the tin with lithium results in a volume expansion that may reach nearly 300% when the tin is saturated with lithium. As the tin layer increases in volume due to alloying with lithium, the copper layer to which it is bonded provides a mechanical constraint, and the bimorph undergoes displacement (e.g., bending). At the negative electrode, the loss of lithium may result in a small stress as well, but this stress is much less than that of the positive electrode since lithium is highly ductile near room temperature. Thus, the entire cell undergoes flexure due to the volume change of the tin layer on the electrochemical actuator comprising the positive electrode. Flexure of the cell in turn applies a pressure to a drug reservoir, which is positioned adjacent the actuator. The drug reservoir contains a fluid comprising a drug and is enclosed by a deformable vessel such as a bladder. The applied pressure causes the drug to be dispensed from the reservoir.

EXAMPLE 3

Electrochemical Bimorph Flexure

In this prophetic example, the bimorph structure of EXAMPLE 2 is fabricated in the shape of a semicircle or "U" shaped flexure as shown in FIGS. 3A-C. One end of the flexure is anchored to a support or housing of the dispensing device, while the other end is free to displace as the bimorph undergoes flexure. Upon discharge of the electrochemical cell, the flexure extends outwards, and the free end of the flexure applies a force to a drug-containing bladder, dispensing a drug through an orifice or valve from the bladder.

EXAMPLE 4

Self-powered Morphing Actuator with Built-in Amplification

In this Example, an electrochemical cell was fabricated and was studied for its ability to actuate upon application of a voltage or current. A porous pellet was pressed from −325 mesh tin powder (99.8% [metals basis], Alfa Aesar) in a ½-inch diameter die under 750 lbf. The pellet weighed 0.625 g and was measured to have a thickness of 0.89 mm. The pellet was soldered to copper foil of 15 micrometer thickness using BiSnAg solder (Indium Corporation of America) and flux #5RMA (Indium Corporation of America) by heating the assembly in an air furnace at 180° C. for 30 minutes. This electrode assembly was used as the positive electrode in an electrochemical cell, while lithium foil (~0.8 mm thickness, Aldrich) was used as the negative electrode.

Two layers of Celgard 2400 separator were used to separate the tin positive electrode and the lithium foil negative electrode. The lithium foil electrode was attached to a current collector made also from the 15 micron thick copper foil. A liquid electrolyte consisting of 1.33 M $LiPF_6$ dissolved in a mixed solvent of ethylene carbonate, propylene carbonate, dimethyl carbonate, and ethyl methyl carbonate (4:1:3:2 by volume) was used. The cell was sealed in an envelope made of polyethylene bagging material using a heat sealer. Upon assembly the open circuit voltage of the cell was 2.8-2.9V, showing that it was in the charged state. Upon discharge the cell voltage dropped rapidly to a relatively constant value of 0.5-0.4V, as is characteristic of the Sn—Li electrochemical couple.

Figure 17:
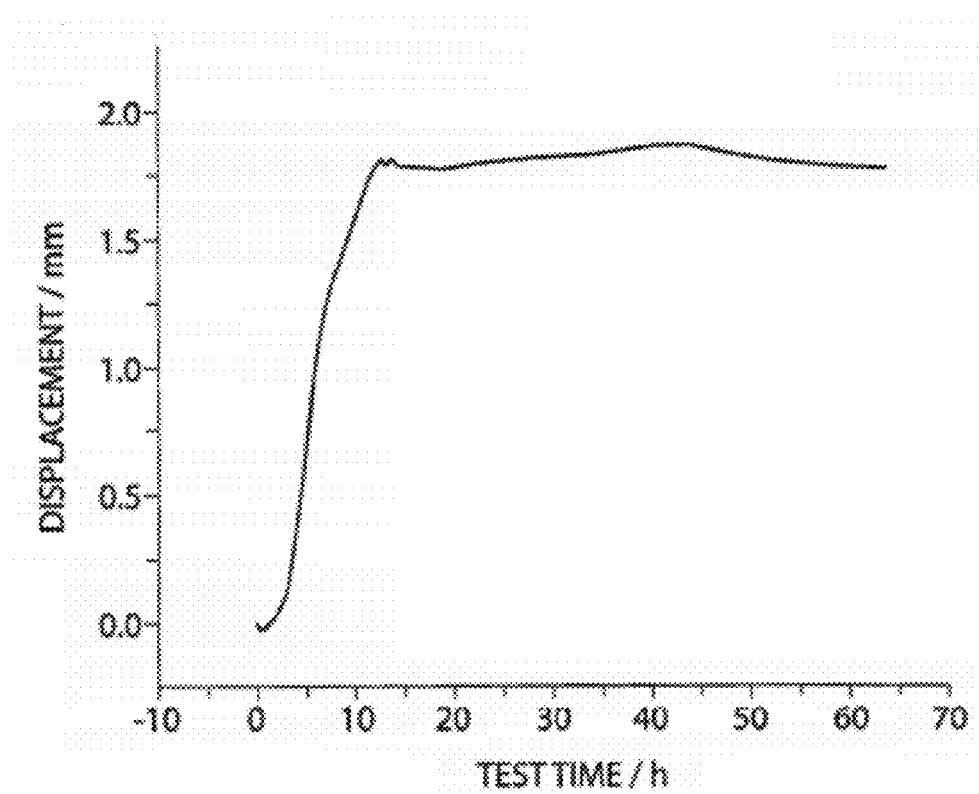
FIG. 17 shows a graph of displacement versus time curve for self-powered morphing actuator with built-in strain amplification.

The cell was discharged across a 1 ohm resistor that connected the positive and negative current collectors. The displacement measured normal to the plane of the tin disc and lithium foil while the cell discharged was measured using a linear variable differential transformer (LVDT) from Micro-Epsilon. Readings were measured through a National Instruments NI-USB 6009 data acquisition device interfaced with LabView (National Instruments). FIG. 17 shows a graph of the resulting displacement from this experiment as a function of time.

After an initial small compression caused by the lithium and separator yielding under the small applied force of the LVDT, the actuator extended by 1.8 mm as it discharged over a period of 11 hours. This absolute displacement exceeded the initial thickness of the Sn pellet by about a factor of two. Inspection of the disassembled actuator after the test showed that discharge had occurred, with lithium being eroded from the negative electrode and alloying with the tin pellet from one side. It was readily observed that the displacement of the actuator was due to the cylindrical tin pellet deforming into a "cupped" shape with the convex surface being the side facing the separator and lithium electrode. Thus, it was seen that the shape-morphing of the tin pellet was due to the creation of a differential strain across the pellet, with the side facing the lithium electrode undergoing expansion. Mechanical loading in the direction of displacement normal to the plane of the pellet after deformation showed that a load of more than 1 kg could be supported without fracture of the deformed pellet. Thus, the actuator has substantial stiffness, which would be useful for applications such as the dispensing or pumping of a fluid-filled bladder, as in a drug delivery applications where the fluid may be dispensed through one or more needles or microneedles. By placing the actuator of this example in proximity to such a fluid-filled bladder, and enclosing the whole in a rigid container, a drug delivery device could be obtained.

Such a drug delivery device would be suitable, for example, for a 3-day (72 h) delivery of insulin. Rapid acting insulin such as the Lilly product Lispro® are generally packaged as solutions with 100 units per mL concentration. The total daily payload of insulin solution may be approximately 50 units or 0.5 mL. Thus, a pump with a three day supply can accommodate a total volume of ~2.0 mL. For example, the actuator described in this Example produced a displacement of more than 1.5 mm, which, when acting on a reservoir of 13 cm² area, can easily obtain the desired 2.0 mL volume. Typical basal insulin levels might be adjusted between 0.5 to 1.5 units per hour. A bolus dose for a meal might consist of 1 unit per 10 gm of carbohydrate consumed, so as much as 10 units for a meal may be desired. The pharmacodynamics of the rapid acting insulin suggests that the dose can be delivered over 15 minutes. Thus, the peak rate of delivery may correspond to 5% of the total volume over 15 minutes. Taking a displacement of 1.5 mm to correspond to complete delivery of a 2 mL insulin payload, the actuator in this Example can readily meet the bolus rate requirement. In order to slow down the rate to meet the basal rate requirement, an increase in resistance of the external load or duty cycle control, as described below in Example 7, can be implemented.

This Example may demonstrate the electrochemical actuator and drug delivery device in certain embodiments of the invention, by demonstrating electrochemical actuation due to the creation of differential strain across an electrode. Consideration of the net volume change of the actuator during discharge of the cell showed that the displacement obtained was not correlated with the net volume change, and was in fact opposite in sign to the net volume change of the cell. Comparing the partial molar volume of lithium in various $Li_xSn$ alloys with the molar volume of pure lithium, it was observed that pure lithium had a larger molar volume and therefore discharge of a cell in which lithium was the negative electrode resulted in a net volume decrease. For example, $Li_{2.5}Sn$, a compound of relatively low Li/Sn stoichiometry, has a molar volume of 38.73 cm³ mol⁻¹. Since pure Sn metal has a molar volume of 16.24 cm³ mol⁻¹, the difference, 22.49 cm³ mol⁻¹, of the compound was the volume occupied by the 2.5 Li in $Li_{2.5}Sn$. In comparison, the molar volume of pure Li was 13.10 cm³ mol⁻¹, such that 2.5 moles of Li metal would have a volume of 32.75 cm³. Therefore, complete discharge of a cell to form $Li_{2.5}Sn$ on the positive electrode side would result in the transfer of 2.5 moles of lithium from the Li electrode to the Sn, resulting in a net decrease in the volume of the device. Similarly, the molar volume of Li in $Li_{4.4}Sn$, a compound of relatively high stoichiometry, is 42.01 cm³ mol⁻¹, whereas 4.4 moles of pure Li metal has a volume of 57.62 cm³ mol⁻¹. Again, the discharge of such a cell resulted in a net volume decrease. The outward or positive displacement observed in the actuator of this Example occurred despite the negative volume change upon discharge. The flexure or "cupping" mode of deformation of the actuator amplified the deformation due to differential strain across the pellet.

EXAMPLE 5

Galvanostatic Discharge of an Electrochemical Actuator

In the following example, the galvanostatic discharge of an electrochemical cell was studied. An electrochemical cell as described in Example 4 was fabricated, with conductive copper adhesive tape used as the contact between the porous tin pellet and the copper current collector, instead of solder. The cell was galvanostatically discharged (constant discharge current) using a Maccor 4300 battery tester (Maccor). The tin pellet weighed 0.628 g and was measured to have a thickness of 1.06 mm. The theoretical capacity of the pellet was 624 mAh, assuming all of the tin was lithiated to the compound $Li_{4.4}Sn$. Upon assembly the open circuit voltage of the cell was 2.8-2.9V, showing that it was in the charged state. The cell was discharged at 0.88 mA to 0.01V. The discharge capacity was 56.22 mAh, showing that the cell was discharged to only 9% of its theoretical capacity over the discharge time of 63.6 h. However, the Sn pellet was observed to have cupped in the same manner and to approximately the same deformation as the actuator in Example 1. This Example demonstrated the current-limited control of an electrochemical actuator which can spontaneously discharge and actuate if the positive and negative leads were closed in an external circuit.

EXAMPLE 6

Electrochemical Bimorph Actuators

A bimorph electrode was fabricated by masking one side of a copper foil of 50 micrometer thickness and 40 mm×5 mm area with Kapton adhesive tape and dipping the foil in molten tin to coat one side with a layer of tin. It was expected that upon electrochemical lithiation of the tin, the constraint provided by the copper foil would result in bending or "curling" of the bimorph structure with the convex side being the lithiated tin. An electrochemical cell like those in Examples 4 and 5 was assembled using this bimorph as the positive electrode, assembled with the tin layer facing the separator and lithium foil negative electrode. Upon assembly, the open circuit voltage of the cell was 2.8-2.9V, showing that the cell was in the charged state. The cell was galvanostatically discharged to 0.01 V with a current of 0.089 mA. The discharge capacity was 7.7 mAh, representing about 50% state-of-discharge for a tin layer thickness of about 10 micrometers and assuming a fully lithiated composition of $Li_{4.4}Sn$.). After discharge, the cell was disassembled, and the tin-copper bimorph electrode showed substantial bending at all free edges of the bimorph, demonstrating shape-morphing.

In other experiments, tin metal foil samples of 0.05 mm (99.999% [metals basis], Alfa Aesar) and 0.10 mm (99.99% [metals basis], Alfa Aesar) thickness were each joined to 15 micrometer thick copper foil, forming flat bimorph electrodes of 20 mm×5 mm area. Electrochemical cells were constructed using two layers of Celgard 2400 separator to separate the tin/copper bimorph positive electrode and a 0.4 mm thick lithium foil (Aldrich) negative electrode. For each cell, the lithium foil electrode was attached to a current collector made also from the 15 micron thick copper foil, and a liquid electrolyte consisting of 1.33 M $LiPF_6$ dissolved in a mixed solvent of ethylene carbonate, propylene carbonate, dimethyl carbonate, and ethyl methyl carbonate (4:1:3:2 by volume) was used. Each cell was sealed in an envelope made of polyethylene bagging material using a heat sealer.

Figure 19:
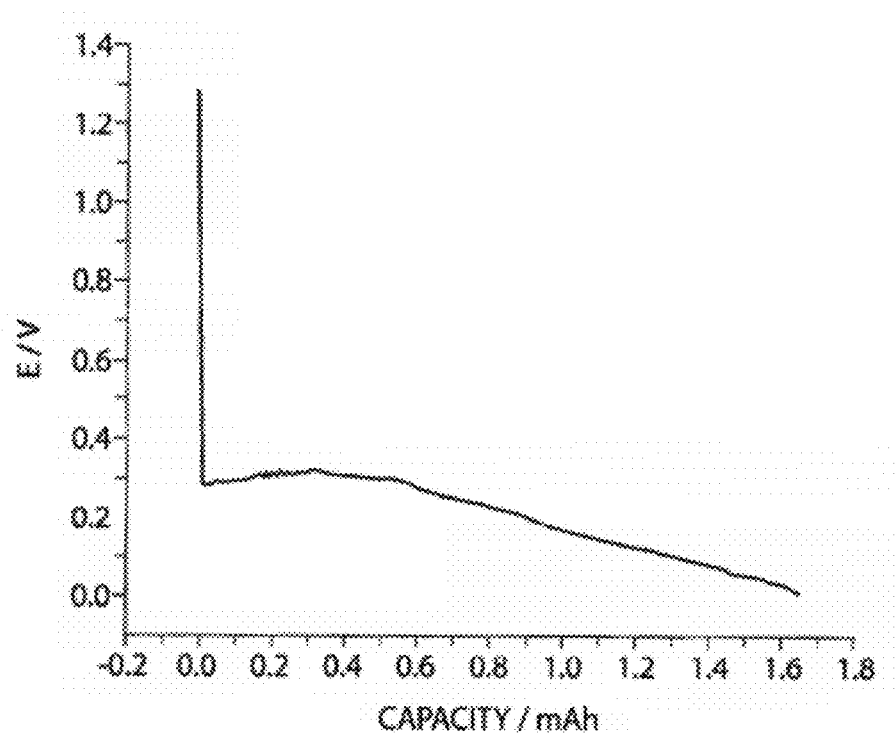
FIG. 19 shows a galvanostatic discharge profile of a bimorph electrochemical actuator utilizing a 0.10 mm thick tin foil bonded to copper foil.

The cells were discharged galvanostatically using a Maccor 4300 battery tester (Maccor). The cell made using 0.10 mm thick tin foil was discharged at 0.4178 mA to 0.01V. The discharge capacity was 1.65 mAh (4% of the theoretical discharge capacity). The discharge profile for this device is shown in FIG. 19. Upon disassembly, the bimorph electrode was observed to have "curled" at all free edges, demonstrating severe morphing.

Figure 20:
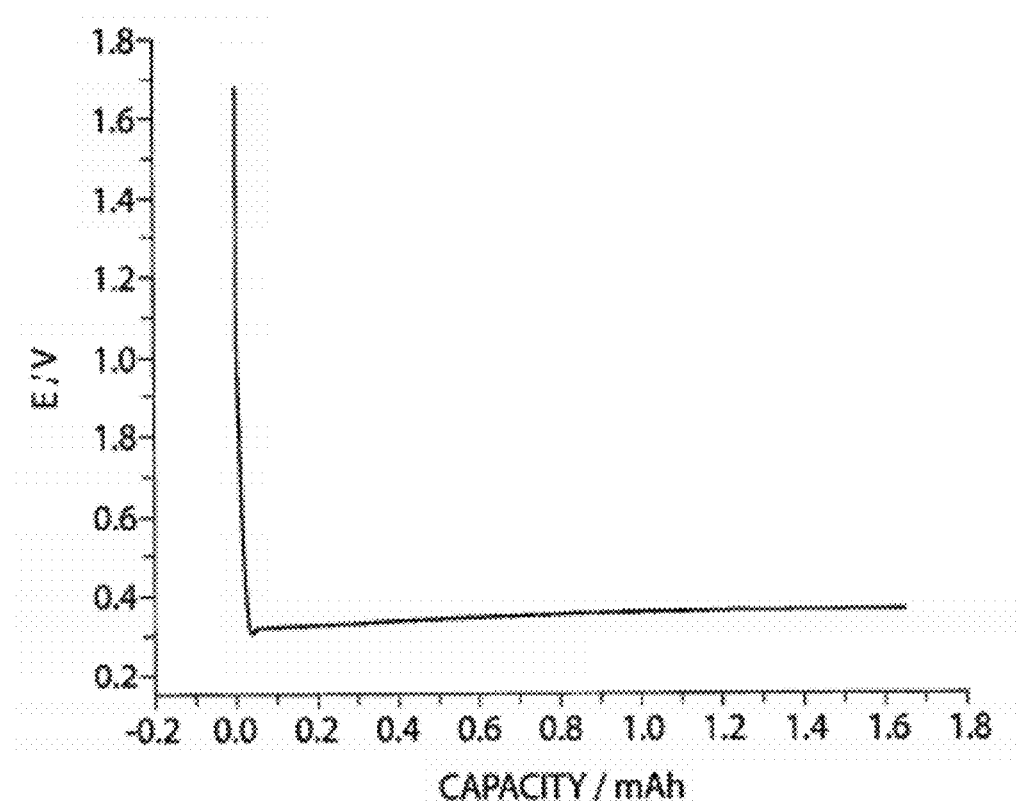
FIG. 20 shows a galvanostatic discharge profile of an electrochemical bimorph cell utilizing a 0.05 mm thick tin foil bonded to copper.

The cell made using 0.05 mm tin foil was discharged at 0.4076 mA until the discharge capacity was 1.65 mAh (4% of the theoretical capacity). The discharge profile for this device is shown in FIG. 20. Similar to the 0.10 mm tin foil bimorph, this device upon disassembly also showed bending at all free edges of the bimorph.

These examples demonstrated various electrochemical bimorph actuators of the invention. These results also show that it may not necessary to fully discharge the electrochemical cells of the invention in order to obtain significant morphing, but that the differential strain resulting from only a few percent discharge of the theoretical cell capacity may be sufficient to achieve desired actuation.

EXAMPLE 7

Duty Cycle Control of an Electrochemical Actuator

Figure 18:
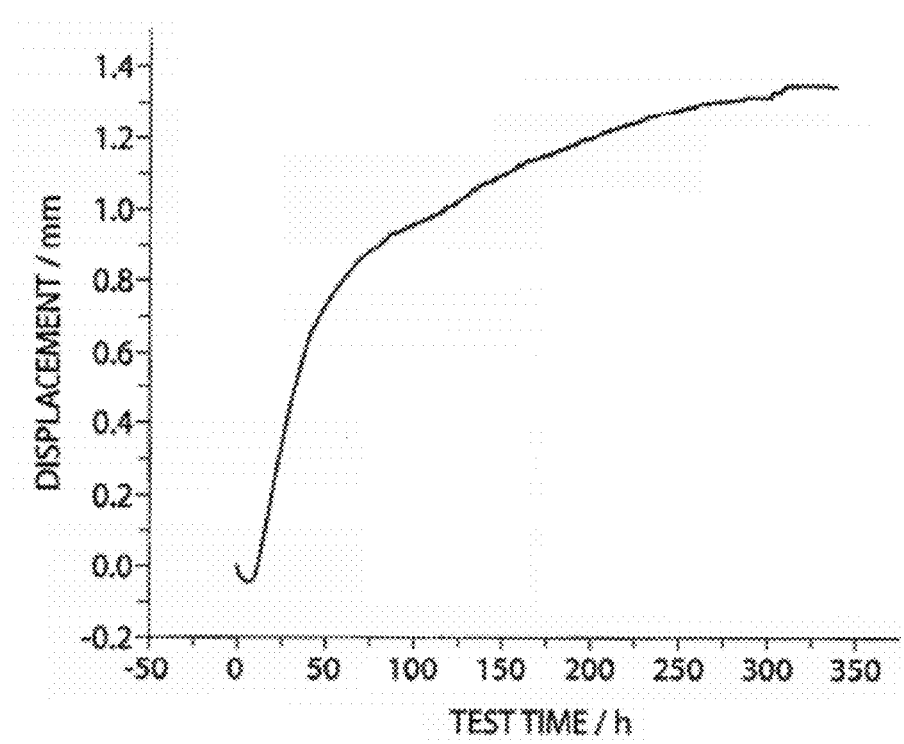
FIG. 18 shows a graph of the displacement curve for an electrochemical morphing actuator controlled by a 20% duty cycle.

An electrochemical actuator of similar design to that described in Example 1 was subjected to duty cycle controlled discharge in order to obtain a slow deformation rate. The duty cycle was controlled by an electronic relay (Radio Shack), which was switched on and off through current control from a Maccor 4300 battery tester (Maccor), connected in series with the 1 ohm external load resistor across the terminals of the electrochemical cell. The relay closed while receiving current from the battery tester and opened when the current was interrupted. A 20% duty cycle was configured, in which the current was turned on for 50 ms out of a total period of 200 ms. FIG. 18 shows a graph of the displacement curve for the electrochemical morphing actuator, controlled by a 20% duty cycle. The resulting displacement of the device, shown in FIG. 18, demonstrated deformation of the actuator at a low controlled rate. As described herein, an alternative method of obtaining a controlled low rate of deformation may be to discharge the actuator in FIG. 18 through a higher resistance external load.

EXAMPLE 8

Self-Powered Electrochemical Actuator Having Larger Driving Voltage

Under some circumstances a higher average discharge voltage than that for the preceding examples utilizing tin and lithium metal may be desirable, such as when a substantial driving voltage is needed, even in the presence of significant cell polarization. Antimony can be a useful morphing electrode material for such applications due to its relatively larger open circuit voltage vs. lithium metal (~0.95V). An electrochemical device was prepared as in Example 1, using −325 mesh antimony powder (99.5% [metals basis], Alfa Aesar) instead of the tin powder. The antimony powder was pressed at 2250 lbf in a ½ inch diameter die. The resulting pellet was 0.687 g and 1.31 mm thick, corresponding to a theoretical capacity of 454 mAh. The sample was galvanostatically discharged at a current of 3.025 mA to 0.01V. The discharge capacity was 49.98 mAh (11% of theoretical capacity), and resulted in severe deformation of the antimony pellet.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. An actuator device, comprising:
    an electrochemical cell including a negative electrode and a positive electrode, wherein at least a portion of the negative electrode is formed with a material formulated to at least one of intercalate, de-intercalate, alloy with, oxidize, reduce, or plate with the positive electrode such that a differential strain is imparted to the positive electrode, such that the differential strain produces a displacement of at least a portion of the electrochemical cell upon charging or discharging of the electrochemical cell.

2. The actuator device of claim 1, wherein the differential strain is imparted between a first portion of the positive electrode and a second portion of the positive electrode.

3. The actuator device of claim 1, wherein the material is formulated to at least one of intercalate, de-intercalate, alloy with, oxidize, reduce, or plate with a first portion of the positive electrode to an extent different than a second portion of the positive electrode such that the differential strain is imparted between the first portion and the second portion of the positive electrode.

4. The actuator device of claim 2, wherein the material includes an intercalating species.

5. The actuator device of claim 4, wherein the species is formulated to intercalate into the first portion to a different extent than the second portion.

6. The actuator device of claim 1, further comprising:
    a structure configured to be displaced from a first orientation to a second orientation by displacement of the electrochemical cell.

7. The actuator device of claim 1, wherein discharging of the electrochemical cell causes the electrochemical cell to apply a force on a reservoir, thereby causing a fluid to be delivered from the reservoir.

8. A device for delivering a fluid to a patient comprising:
    an electrochemical cell including a negative electrode and a positive electrode, wherein at least a portion of the negative electrode is formed with a material formulated to at least one of intercalate, de-intercalate, alloy with, oxidize, reduce, or plate with the positive electrode upon at least one of a charge or a discharge of the electrochemical cell, resulting in a deflection of at least one of the negative electrode or the positive electrode, and wherein the deflection causes delivery of a fluid into a body.

9. The actuator device of claim 8, wherein the negative electrode and the positive electrode are mechanically coupled such that the deflection of the at least one of the negative electrode or the positive electrode produces a displacement of at least a portion of the electrochemical cell upon the at least one of charging or discharging of the electrochemical cell.

10. The actuator device of claim 8, wherein the at least a portion of the negative electrode is formed with a material formulated to at least one of intercalate, de-intercalate, alloy with, oxidize, reduce, or plate with the positive electrode such that a differential strain is imparted to the positive electrode.

11. The actuator device of claim 10, wherein the negative electrode and the positive electrode are mechanically coupled such that the differential strain produces the deflection of the at least one of the negative electrode and the positive electrode upon at least one of charging or discharging of the electrochemical cell.

12. The actuator device of claim 10, wherein the differential strain is imparted between a first portion of the positive electrode and a second portion of the positive electrode.

13. The actuator of claim 8, wherein the deflection is at least 25 percent of the initial volume.

14. The actuator device of claim 9, further comprising:
    a structure configured to be displaced from a first orientation to a second orientation by the displacement of the electrochemical cell.

15. The device of claim 8, further comprising:
    an electrical circuit electrically coupled to the negative electrode and the positive electrode so as to allow the electrochemical cell to discharge therethrough.

16. A device for delivering a therapeutic to a patient comprising:
    a fluid reservoir;
    a housing suited for removably associating the fluid reservoir with the body of the patient; and
    an electrochemical cell including a negative electrode and a positive electrode, wherein at least a portion of the negative electrode is formed with a material formulated to at least one of intercalate, de-intercalate, alloy with, oxidize, reduce, or plate with the positive electrode such that a differential strain is imparted to the positive electrode, the differential strain producing a displacement of at least a portion of the electrochemical cell upon charging or discharging of the electrochemical cell,
    wherein the displacement of at least a portion of the electromechanical cell is operative to cause fluid to be delivered from the fluid reservoir.

17. The device of claim 16, further comprising:
    an electrical circuit electrically coupled to the negative electrode and the positive electrode so as to allow the electrochemical cell to discharge therethrough.

18. The device of claim 17, wherein the electrical circuit includes only fixed resistive elements.

19. The device of claim 16, further comprising:
    a structure coupled to the housing and configured to be displaced from a first orientation to a second orientation by the displacement of the electrochemical cell.

20. The device of claim 16, wherein at least one of the positive electrode and the negative electrode is a bimorph electrode, the bimorph electrode including a dimensionally active material disposed on a non-dimensionally active material, the bimorph electrode configured to change volume or position upon charging or discharging of the electrochemical cell.

21. The device of claim 8, wherein the fluid includes a drug.

22. The device of claim 16, wherein the fluid delivered from the fluid reservoir includes a drug.

* * * * *